US007955528B2

(12) United States Patent
Chung et al.

(10) Patent No.: US 7,955,528 B2
(45) Date of Patent: Jun. 7, 2011

(54) CONDUCTIVE INKS AND MANUFACTURING METHOD THEREOF

(75) Inventors: Kwang-Choon Chung, Yongin (KR); Hyun-Nam Cho, Gunpo (KR); Myoung-Seon Gong, Seoul (KR); Yi-Sup Han, Goyang (KR); Jeong-Bin Park, Ansan (KR); Dong-Hun Nam, Seoul (KR); Seong-Yong Uhm, Suwon (KR); Young-Kwan Seo, Siheung (KR); Nam-Boo Cho, Anyang (KR)

(73) Assignee: Inktec Co., Ltd, Kyeongki-do (KR)

( * ) Notice: Subject to any disclaimer, the term of this patent is extended or adjusted under 35 U.S.C. 154(b) by 0 days.

(21) Appl. No.: 12/722,689

(22) Filed: Mar. 12, 2010

(65) Prior Publication Data

US 2010/0247798 A1   Sep. 30, 2010

Related U.S. Application Data

(62) Division of application No. 11/817,374, filed as application No. PCT/KR2006/000754 on Mar. 4, 2006, now Pat. No. 7,691,294.

(30) Foreign Application Priority Data

| Mar. 4, 2005 | (KR) | .................. | 10-2005-0018364 |
| Mar. 21, 2005 | (KR) | .................. | 10-2005-0023013 |
| Apr. 14, 2005 | (KR) | .................. | 10-2005-0031090 |
| Apr. 26, 2005 | (KR) | .................. | 10-2005-0034371 |

(51) Int. Cl.
    *H01B 1/00* (2006.01)
(52) U.S. Cl. ............ 252/512; 106/31.43; 427/216; 427/123; 428/673; 429/338; 556/50; 252/518.1

(58) Field of Classification Search .................. 252/500; 106/31.43; 428/673; 427/673; 429/338; 556/50
See application file for complete search history.

(56) References Cited

U.S. PATENT DOCUMENTS

| 3,773,538 A | 11/1973 | Milutin et al. |
| 4,034,037 A | 7/1977 | Jordan |
| 4,542,214 A | 9/1985 | Bechara |
| 4,600,598 A | 7/1986 | Nelson et al. |
| 4,652,465 A | 3/1987 | Koto et al. |

(Continued)

FOREIGN PATENT DOCUMENTS

EP   0504662 A1   9/1992

(Continued)

OTHER PUBLICATIONS

Binnemans et al., "Structure and Mesomorphism of Silver Alkanoates," Chem. Mater., Apr. 1, 2004, pp. 2021-2027, vol. 16, 2004 American Chemical Society.

(Continued)

*Primary Examiner* — Mark Kopec
*Assistant Examiner* — Khanh T Nguyen
(74) *Attorney, Agent, or Firm* — The Webb Law Firm

(57) ABSTRACT

The present invention relates to a variety of conductive ink compositions comprising a metal complex compound having a special structure and an additive and a method for preparing the same, more particularly to conductive ink compositions comprising a metal complex compound obtained by reacting a metal or metal compound with an ammonium carbamate- or ammonium carbonate-based compound and an additive and a method for preparing the same.

12 Claims, 9 Drawing Sheets

U.S. PATENT DOCUMENTS

| | | | |
|---|---|---|---|
| 4,762,560 | A | 8/1988 | Brasch |
| 5,246,817 | A | 9/1993 | Shipley, Jr. |
| 5,534,312 | A | 7/1996 | Hill et al. |
| 5,654,114 | A | 8/1997 | Kubota et al. |
| 5,705,661 | A | 1/1998 | Iwakura et al. |
| 6,387,542 | B1 * | 5/2002 | Kozlov et al. .................. 428/673 |
| 2002/0117652 | A1 | 8/2002 | Sano et al. |
| 2006/0145125 | A1 | 7/2006 | Kuwajima et al. |

FOREIGN PATENT DOCUMENTS

| | | | |
|---|---|---|---|
| JP | 61163975 | A | 7/1986 |
| JP | 07-145409 | * | 6/1995 |
| JP | 7188593 | A | 7/1995 |
| JP | 10110123 | A | 4/1998 |
| JP | 1326297 | | 10/1998 |
| JP | 11319538 | A | 11/1999 |
| JP | 2002129259 | A | 5/2002 |
| JP | 2002329419 | A | 11/2002 |
| JP | 2004176115 | A | 6/2004 |
| JP | 2004221006 | A | 8/2004 |
| JP | 2004231982 | A | 8/2004 |
| JP | 2004256757 | A | 9/2004 |
| JP | 2004273205 | A | 9/2004 |
| KR | 1020030085357 | A | 11/2003 |
| KR | 1020050011475 | A | 1/2005 |
| KR | 1020050011478 | A | 1/2005 |
| KR | 10-2005-0018364 | A | 2/2005 |
| KR | 1020050018364 | A | 2/2005 |
| KR | 10-2005-0023013 | A | 9/2006 |
| KR | 1020050023013 | A | 9/2006 |
| KR | 10-2005-0031090 | | 10/2006 |
| KR | 10-2005-0034371 | | 10/2006 |
| RU | 2 388 774 | C2 | 5/2011 |

OTHER PUBLICATIONS

George et al., "Detection of Pre-Sol Aggregation and Carbon Dioxide Scrambling in Alkylammonium Alkylcarbamate Gelators by Nuclear Magnetic Resonance," Langmuir, Aug. 19, 2003, pp. 8168-8176, vol. 19, 2003 American Chemical Society.

George et al., "Primary Alkyl Amines as Latent Gelators and Their Organogel Adducts with Neutral Triatomic Molecules," Langmuir, Jan. 21, 2003, pp. 1017-1025, vol. 19, 2003 American Chemical Society.

Magdassi et al., "Silver Nanoparticles as Pigments for Water-Based Ink-Jet Inks," Chem. Mater., Apr. 24, 2003, pp. 2208-2217, vol. 15, 2003 American Chemical Society.

Szlyk et al., "CVD of AgI Complexes with Tertiary Phosphines and Perfluorinated Carboxylates—A New Class of Silver Percursors," Chemical Vapor Deposition, Nov. 27, 2000.

Whitcomb et al., "The molecular structure of [bis-triphenylphosphine-silver(I) stearate], $[((C6H5)3P)2Ag(O2C(CH2)16CH3)]$, solubilization of long alkyl chain silver carboxylates," Journal of Chemical Crystallagraphy, 1996, pp. 99-105, vol. 26, No. 2.

Jaber et al., "Crystal structure of ammine silver(I) p-nitrobenzoate," Eur. J. Solid State Inorg. Chem., 1995, pp. 25-33, vol. 32, Gauthier-Villars.

Song et al.,"[(CO)3(PPh3)2OsAg(O2CCF3)]: A Model for an Intermediate on the Reaction Coordinate in Electron Transfer," Angew. Chem. Int. Ed. Engl., 1992, pp. 770-772, No. 6, VCH Verlagsgesellschafl mbH. W-6940 Weinhelm, 1992.

Edwards et al., "Silver(I) carboxylates-II. Some complexes of silver(I) acetate[1]," J. Inorg. nucl. Chem., 1978, pp. 1599-1601, vol. 40, Pergamon Press Ltd., 1978.

Thomas et al., "Anisotropic Semiconduction in Single Crystals of Dichlorodiammine-palladium(ii)-tetrachlorodiamminepalladium(iv) and Related Halogen-bridged Mixed-valence Complexes," J. Chem. Soc. (A), 1971, pp. 512-515.

Oldham, "Complexes of Simple Carboxylic Acids," Prog. Inorg. Chem, 1959, pp. 223-258, Wiley.

George et al., "Chemically Reversible Organogels: Aliphatic Amines as "Latent" Gelators with Carbon Dioxide", Journal of American Chemistry Society, 2001, pp. 10,393-10,394, vol. 123, American Chemical Society.

George et al., "Chemically Reversible Organogels via "Latent" Gelators. Aliphatic Amines with Carbon Dioxide and Their Ammonium Carbamates", Langmuir, 2002, pp. 7,124-7,135, vol. 18, American Chemical Society.

* cited by examiner (A)　　　　　　(B)　　　　　　(C)

CONDUCTIVE INKS AND MANUFACTURING METHOD THEREOF

This application is a divisional application of U.S. application Ser. No. 11/817,374, filed Aug. 29, 2007 and claims priority from Korean Patent application No. 10/2005-018364 filed Mar. 4, 2005 which are incorporated herein by reference in their entirety.

TECHNICAL FIELD

The present invention relates to a conductive ink composition comprising a metal complex compound having a special structure and an additive and a preparing method thereof.

BACKGROUND ART

Recently, conductive ink is drawing attention since it is useful in metal film or pattern formation and electrode printing in the field of lead (Pb) free electric/electronic circuits, low-resistance metal wirings, printed circuit boards (PCB), flexible printed circuit boards (FPC), antennas for radio frequency identification (RFID) tags, electromagnetic interference (EMI) shielding, plasma displays (PDP), liquid crystal displays (TFT-LCD), organic light emitting diodes (OLED), flexible displays and organic thin film transistors (OTFT).

Japanese Patent Laid-Open No. 2004-221006 (Aug. 5, 2004) and Japanese Patent Laid-Open No. 2004-273205 (Sep. 30, 2004) disclose conductive inks in the form of a paste prepared from nanoparticle, powder or flake of metal or metal alloy using a binder resin or a solvent. *Chem. Mater.*, 15, 2208 (2003), Japanese Patent Laid-Open No. Hei 11-319538 (Nov. 24, 1999), Japanese Patent Laid-Open No. Hei 2004-256757 (Sep. 10, 2004) and U.S. Pat. No. 4,762,560 (Aug. 9, 1988) disclose the method of reacting such metal compounds as silver nitrate, hydrogen tetrachloroaurate and copper sulfate with other compounds in an aqueous solution or an organic solvent to form colloids or nanoparticles. However, these methods are uneconomical and less stable and require a complicated process. In addition, the high baking temperature makes them inappropriate to be applied for a variety of substrates.

Carboxylate is well known as a ligand that forms complexes, particularly organic metal complexes *Prog. Inorg. Chem.*, 10, p. 233 (1968). In general, since metal carboxylate complexes are less soluble in organic solvents *J. Chem. Soc.*, (A)., p. 514 (1971), U.S. Pat. No. 5,534,312 (Jul. 9, 1996) and are discomposed at high temperature, they are limited in application in spite of easiness in preparation. Several methods have been proposed to solve this problem in *J. Inorg. Nucl. Chem.*, 40, p. 1599 (1978), *Ang. Chem., Int. Ed. Engl.*, 31, p. 770 (1992), *Eur. J. Solid State Inorg. Chem.*, 32, p. 25 (1995), *J. Chem. Cryst.*, 26, p. 99 (1996), *Chem. Vapor Deposition*, 7, 111 (2001), *Chem. Mater.*, 16, 2021 (2004), U.S. Pat. No. 5,705,661 (Jan. 6, 1998), Japanese Patent Laid-Open No. 2002-329419 (Nov. 15, 2002) and Korean Patent Publication No. 2003-0085357 (Nov. 5, 2003). Of them are the methods of using a carboxylate compound with a long alkyl chain or using an amine compound or a phosphine compound.

The present inventors have presented stable and highly soluble complex compounds and preparation methods thereof in Korean Patent Application Nos. 2005-11475 and 2005-11478. Particularly, in Korean Patent Application Nos. 2005-18364 and 2005-23013, they presented stable and transparent conductive ink compositions with superior solubility and good conductivity, metal content of which and film thickness can be easily controlled, and methods for forming metal patterns easily even at low temperature using the compositions. However, a variety of conductive inks are required to produce high-quality specialty products or to meet the situation where special properties are needed.

According to *Ullmann's Encyclopedia of Ind. Chem.*, Vol. A24, 107 (1993), silver is a percious metal which is not oxidized easily and has good electrical and thermal conductivity and catalytic and antibacterial activity, and thus silver and silver compounds are used widely in the industries, in silver alloys, plating, medicines, photographs, electric and electronic products, fibers, detergents, household appliances, etc. In addition, silver compounds can be used as catalyst in the synthesis of organic compounds and polymers. Particularly, silver is recently used in the new fields that require metal patterns or electrodes, including lead-free electric/electronic circuits, low-resistance metal wiring, PCBs, FPCs, antennas for RFID tags, EMI shielding, PDPs, TFT-LCDs, OLEDs, flexible displays and OTFTs.

Of recent, researches for replacing aluminum with silver, which has better reflection and conduction properties, in reflection film for reflection type or semi-transparent type LCDs are in progress, as disclosed in Japanese Patent Laid-Open No. 2002-129259 (May 9, 2002), Japanese Patent Laid-Open No. 2004-176115 (Jun. 24, 2004) and Japanese Patent Laid-Open No. 2004-231982 (Aug. 19, 2004).

However, compounds derived from silver are limited and they lack stability and solubility. In addition, they have a decomposition temperature of 200° C. or higher, which is too high to obtain a metal pattern with good conductivity, and are decomposed slowly.

The present inventors have worked consistently to solve these problems and come to complete this invention. The present invention provides a conductive ink composition having very superior stability and solubility, enabling easy formation of thin film and being easily calcined even at low temperature, thereby enabling formation of uniform and percise film or pattern with good conductivity regardless of the particular substrate used, and a method for preparing the same.

DISCLOSURE OF THE INVENTION

It is an object of the present invention to provide a conductive ink composition comprising a metal complex compound having a special structure and an additive and a preparing method thererof.

It is another object of the present invention to provide a conductive ink composition enabling easy control of metal content and film thickness and a method for preparing the same.

It is still another object of the present invention to provide a conductive ink composition being calcined even at a low temperature of 200° C. or below and enabling easy formation of uniform and precise film or micropattern with good conductivity and a method for preparing the same.

It is still another object of the present invention to provide a conductive ink composition having superior stability and solubility and enabling easy formation of film without regard to the particular substrate used and a method for preparing the same.

To attain the objects, the present inventors invented a conductive ink composition comprising a metal complex compound obtained by reacting at least one metal or metal compound represented by the formula 1 below with at least one ammonium carbamate- or ammonium carbonate-based compound represented by the formula 2, 3 or 4 below and an additive and a method for preparing the same:

$$M_nX \quad (1)$$

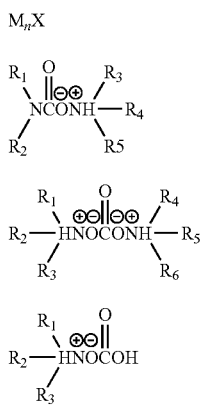

(2)

(3)

(4)

In the formula 1, M is a metal or metal alloy, n is an integer from 1 to 10 and X is nonexistent or at least one substituent selected from the group consisting of hydrogen, ammonium, oxygen, sulfur, halogen, cyano, cyanate, carbonate, nitrate, nitrite, sulfate, phosphate, thiocyanate, chlorate, perchlorate, tetrafluoroborate, acetylacetonate, mercapto, amide, alkoxide, carboxylate and derivatives thereof.

And in the formulas 2 to 4, each of R1, R2, R3, R4, R5 and R6 is independently selected from hydrogen; substituted or unsubstituted $C_1$-$C_{30}$ aliphatic alkyl, cycloaliphatic alkyl, aryl or aralkyl; polymer compound; heterocyclic compound; and derivatives thereof, where R1 and R2 or R4 and R5 may be connected with each other to form an alkylene ring with or without a heteroatom. Although not limiting the present invention, it is preferable that R1 and R4 are $C_1$-$C_{14}$ aliphatic alkyl and each of R3, R4, R5 and R6 is respectively hydrogen or $C_1$-$C_{14}$ aliphatic alkyl.

Nonrestrictive specific examples of the compound represented by the formula 1 are metals such as Ag, Au, Cu, Zn, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Sm, Eu, Ac and Th or alloys thereof, when n is 1 and X is nonexistent, and metal compounds such as copper oxide, zinc oxide, vanadium oxide, nickel sulfide, palladium chloride, copper carbonate, iron chloride, gold chloride, nickel chloride, cobalt chloride, bismuth nitrate, vanadium acetylacetonate, cobalt acetate, tin lactate, manganese oxalate, gold acetate, palladium oxalate, copper 2-ethylhexanoate, iron stearate, nickel formate, ammonium molybdate, zinc citrate, bismuth acetate, copper cyanide, cobalt carbonate, platinum chloride, hydrogen chloroaurate, tetrabutoxytitanium, dimethoxyzirconium dichloride, aluminum isopropoxide, tin tetrafluoroborate, tantalum methoxide, dodecylmercaptoaurate, indium acetylacetonate and derivatives thereof.

Preferably, the metal or metal compound represented by the formula 1 is silver (Ag) or a silver compound, where n is an integer from 1 to 4 and X is at least one selected from the group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate and derivatives thereof. Nonrestrictive examples of such silver compound are silver oxide, silver thiocyanate, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and derivatives thereof. The silver alloy may be formed from at least one metal selected from Au, Cu, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Si, As, Hg, Sm, Eu, Th Mg, Ca, Sr and Ba, but not particularly limited to them.

Nonrestrictive specific examples of R1, R2, R3, R4, R5 and R6 in the formulas 2 to 4 are hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, methoxyethyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tollyl, benzyl, derivatives thereof, polymer compounds such as polyallylamine and polyethyleneimine and derivatives thereof.

Specific examples of the ammonium carbamate-based compound represented by the formula 2 are ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylcarbamate, benzylammonium benzylcarbamate, triethoxysilylpropylammonium triethoxysilylpropylcarbamate, etc. Specific examples of the ammonium carbonate-based compound represented by the formula 3 are ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminiumammonium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate, etc. And, specific examples of the carbonate-based compound represented by the formula 4 are ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and derivatives thereof.

Preparation method of the ammonium carbamate- or ammonium carbonate-based compound represented by the formulas 2 to 4 and is not particularly limited. For example, the ammonium carbamate-based compound may be prepared from a primary amine, a secondary amine, a tertiary amine or a mixture thereof and carbon dioxide, as disclosed in U.S. Pat. No. 4,542,214 (Sep. 17, 1985), *J. Am. Chem. Soc.*, 123, p. 10393 (2001), *Langmuir*, 18, p. 71247 (2002). An ammonium carbonate-based compound is obtained if 0.5 mole of water is used per 1 mole of amine and an ammonium bicarbonate-based compound is obtained when 1 mole or more of water is used. The preparation may be performed under normal pressure or applied pressure without a solvent or in the presence of such solvent as alcohols like methanol, ethanol, isopropanol and butanol, glycols like ethylene glycol and glycerine, acetates like ethyl acetate, butyl acetate and carbitol acetate, ethers like diethyl ether, tetrahydrofuran and dioxane, ketones like methyl ethyl ketone and acetone, hydrocarbons like hexane and heptane, aromatic solvents like benzene and toluene and halogen-substituted solvents like chloroform, methylene chloride and carbon tetrachloride. The carbon dioxide may be bubbled in gas phase or used in the form of dry ice. Alternatively, the preparation may be performed in the supercritical phase. Any other known methods can be applied in the preparation of the ammonium carbamate derivative and ammonium the carbonate-based derivative used in the present invention, as long as the final structure is the same. That is, solvent, reaction temperature, concentration, catalyst, etc. are not particularly limited in the preparation. Nor the preparation yield is particularly limited.

Along with the carbon dioxide, a composite ammonium compound obtained by reacting an amine compound with a triatomic molecule may be used. For example, an adduct obtained by reacting an amine compound such as propylamine, decylamine and octadecyl amine with nitrogen dioxide, sulfur dioxide or carbon disulfide, refer to *Langmuir*, 19, p. 1017 (2003) and *Langmuir*, 19, p. 8168 (2003), may be used along with the ammonium compound of the present invention. Or, a composite ammonium carbamate or carbonate-based compound may be prepared directly during the reaction with amine, using the triatomic molecule and carbon dioxide. Besides, a compound obtained by reacting the amine compound with a boron compound such as boric acid and boron acid can be used and such ammonium compound as ammonium sulfamate, ammonium sulfate, ammonium hydrogensulfate, ammonium sulfite and a mixture thereof may be used.

The ammonium carbamate- or ammonium carbonate-based compound is reacted with the metal or metal compound to prepare a metal complex compound. For example, at least one metal or metal compound represented by the formula 1 and at least one ammonium carbamate- or ammonium carbonate-based compound represented by the formulas 2, 3 or 4 are reacted under nitrogen atmosphere at normal pressure or applied pressure without a solvent or in the presence of such solvent as water, alcohols like methanol, ethanol, isopropanol and butanol, glycols like ethylene glycol and glycerine, acetates like ethyl acetate, butyl acetate and carbitol acetate, ethers like diethyl ether, tetrahydrofuran and dioxane, ketones like methyl ethyl ketone and acetone, hydrocarbons like hexane and heptane, aromatic solvents like benzene and toluene and halogen-substituted solvents like chloroform, methylene chloride and carbon tetrachloride or a mixture thereof. Alternatively, the metal complex compound may be prepared by preparing a solution comprising the metal or metal compound represented by the formula 1 and at least one amine compound and reacting the solution with carbon dioxide. This reaction may also be performed under normal pressure or applied pressure without a solvent or in the presence of a solvent. However, the preparation method of the metal complex compound is not particularly limited and any known methods can be applied, as long as the final structure is the same. That is, solvent, reaction temperature, concentration, catalyst, etc. are not particularly limited. Nor the preparation yield is particularly limited.

The conductive ink composition of the present invention comprises the metal complex compound and an additive. The additive comprised in the ink composition of the present invention may be such known compounds as conductor, metal precursor, oxidant, stabilizer, solvent, dispersing agent, binder resin, reductant, surfactant, wetting agent, thixotropic agent and leveling agent. The additive is not particularly limited and any known additive may be used within the purpose of the present invention.

As the additive used in the present invention, the kind, size or shape of the conductor or metal precursor is not particularly limited. For the conductor, at least one metal selected from the group consisting of transition metals such as Ag, Au, Cu, Zn, Ni, Co, Pd, Pt, Ti, V, Mn, Fe, Cr, Zr, Nb, Mo, W, Ru, Cd, Ta, Re, Os and Ir, metals such as Al, Ga, Ge, In, Sn, Sb, Pb and Bi, lanthanides such as Sm and Eu and actinides such as Ac and Th, alloys thereof or alloy oxides thereof may be used. In addition, conductive carbon black, graphite, carbon nanotube and such conductive polymers as polyacetylene, polypyrrole, polyaniline, polythiophene and derivatives thereof may be used.

The metal precursor is not particularly limited, either. That is, any metal precursor may be used within the purpose of the present invention, and one endowed with conductivity through heat treatment, oxidation or reduction treatment, IR, UV, electron beam or laser treatment, etc. is more preferred. For example, the metal precursor may be an organometal compound or metal salt and, in general, is represented by the formula 1, where M is at least one metal selected from Ag, Au, Cu, Zn, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Sm, Eu, Ac and Th or an alloy thereof, n is an integer from 1 to 10 and X is at least one substituent selected from hydrogen, ammonium, oxygen, sulfur, halogen, cyano, cyanate, carbonate, nitrate, nitrite, sulfate, phosphate, thiocyanate, chlorate, perchlorate, tetrafluoroborate, acetylacetonate, mercapto, amide, alkoxide, carboxylate and derivatives thereof.

Specifically, at least one of a metal carboxylate such as gold acetate, silver acetate(silver acetate), palladium oxalate, silver 2-ethylhexanoate, copper 2-ethylhexanoate, iron stearate, nickel formate and zinc citrate and a metal compound such as silver nitrate, copper cyanide, cobalt carbonate, platinum chloride, hydrogen tetrachloroaurate, tetrabutoxytitanium, dimethoxyzirconium dichloride, aluminum isopropoxide, tin tetrafluoroborate, vanadium oxide, indium-tin oxide, tantalum methoxide, bismuth acetate, dodecylmercaptoaurate and indium acetylacetonate may be used.

The conductor or metal precursor may have a spherical, linear or planar shape or a combination thereof. They may be in the form of particle, incluidng nanoparticle, powder, flake, colloid, hybrid, paste, sol, solution or a combination thereof. Size or content of the conductor or metal precursor is not particularly limited, as long as they do not negatively affect the properties of the ink. Preferably, the conductor or metal precursor is equal to or smaller than 50 microns in size, considering the film thickness after calcination, more preferably between 1 nm and 25 microns. It is preferable that they are not used in excess, so that the calcination temperature does not rise excessively or coating or pattern formation is not negatively affected. In general, they are used in 1-90 wt %, preferably in 10-70 wt %, per 100 wt % of the entire ink composition.

An oxidant may be used as additive in the preparation of the metalcomplex compound. The oxidant may be an oxidative gas such as air, oxygen and ozone, a peroxide such as hydrogen peroxide ($H_2O_2$), $Na_2O_2$, $KO_2$, $NaBO_3$, $K_2S_2O_8$, $(NH_4)_2S_2O_8$, $Na_2S_2O_8$, $H_2SO_5$, $KHSO_5$, $(CH_3)_3CO_2H$ and $(C_6H_5CO_2)_2$, a peroxy acid such as $HCO_3H$, $CH_3CO_3H$, $CF_3CO_3H$, $C_6H_5CO_3H$, m-$ClC_6H_5CO_3H$, a generally known oxidative inorganic acid such as nitric acid, sulfuric acid, $I_2$, $FeCl_3$, $Fe(NO_3)_3$, $Fe_2(SO_4)_3$, $K_3Fe(CN)_6$, $(NH_4)_2Fe(SO_4)_2$, $Ce(NH_4)_4(SO_4)_4$, $NaIO_4$, $KMnO_4$ and $K_2CrO_4$, a metal or a nonmetal compound. The oxidant may be used either alone or in combination. Heating, cooling, electrolysis, ultrasonification, microwave treatment, high-frequency treatment, plasma treatment, IR treatment or UV treatment may be performed during the prepration.

The stabilizer may comprise, for example, at least one of an amine compound such as primary amine, secondary amine and tertiary amine, an ammonium carbamate, ammonium carbonate or ammonium bicarbonate-based compound described above, a phosphorus compound such as phosphine and phosphite or a sulfur compound such as thiol and sulfide. Specifically, the amine compound may be methylamine, ethylamine, n-propylamine, isopropylamine, n-butylamine, isobutylamine, isoamylamine, n-hexylamine, 2-ethylhexylamine, n-heptylamine, n-octylamine, isooctylamine, nonylamine, decylamine, dodecylamine, hexadecylamine, octadecylamine, docodecylamine, cyclopropylamine, cyclopentylamine, cyclohexylamine, allylamine, hydroxyamine, ammonium hydroxide, methoxyamine, 2-ethanolamine, methoxyethylamine, 2-hydroxypropylamine, methoxypropylamine, cyanoethylamine, ethoxyamine, n-butoxyamine, 2-hexyloxyamine, methoxyethylamine, methoxyethoxyethoxyethylamine, diethylamine, dipropylamine, diethanolamine, hexamethyleneimine, morpholine, piperidine, piperazine, ethylenediamine, propylenediamine, hexamethylenediamine, triethylenediamine, 2,2-(ethylenedioxy)bisethylamine, triethylamine, triethanolamine, pyrrole, imidazole, pyridine, aminoacetaldehyde dimethyl acetal, 3-aminopropyltrimethoxysilane, 3-aminopropyltriethoxysilane, aniline, anisidine, aminobenzonitrile, benzylamine, derivatives thereof or such polymer compounds as polyallylamine and polyethyleneimine or derivatives thereof. Specific examples of the ammonium compound are ammonium carbamate-based compounds such as ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyano ethyl ammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylcarbamate, benzylammonium benzylcarbamate, triethoxysilylpropylammonium triethoxysilylpropylcarbamate and derivatives thereof, such ammonium carbonate-based compounds as ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate and derivatives thereof and such ammonium bicarbonate-based compounds as ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and derivatives thereof. The phosphorus compound may be one represented by the general formula $R_3P$ or $(RO)_3P$, where R is $C_1$-$C_{20}$ alkyl or aryl. Typical examples of such phosphorus compound are tributylphosphine, triphenylphosphine, triethylphosphite and triphenylphosphite. And, the sulfur compound may be butanethiol, n-hexanethiol, diethyl sulfide, tetrahydrothiophene, etc. The content of the stabilizer is not particularly limited, as long as it does not negatively affect the ink properties. However, it is preferable that its content is 0.1-90%, more preferably 1-50%, and most preferably 5-30%, per 100% of the metal or metal compound, in molar ratio. Outside this range, the film conductivity may decrease and lead to the decline in storage stability. The declined storage stability results in the quality problem of film. In addition, the film obtained by coating the ink composition and calcining it may be non-uniform or imprecise and a crack may occur, if the content of the stabilizer is outside the aforementioned range.

A solvent may be required to control the viscosity of the ink or to facilitate film formation. For this purpose, water, an alcohol such as methanol, ethanol, isopropanol, 1-methoxypropanol, butanol, ethylhexyl alcohol and terpineol, a glycol such as ethylene glycol and glycerine, an acetate such as ethyl acetate, butyl acetate, methoxypropyl acetate, carbitol acetate and ethylcarbitol acetate, an ether such as methylcellosolve, butylcellosolve, diethyl ether, tetrahydrofuran and dioxane, a ketone such as methyl ethyl ketone, acetone, dimethylformamide and 1-methyl-2-pyrrolidone, a hydrocarbon such as hexane, heptane, dodecane, paraffin oil and mineral spirit, an aromatic solvent such as benzene, toluene and xylene, a halogen-substituted solvent such as chloroform, methylene chloride and carbon tetrachloride, acetonitrile, dimethylsulfoxide or a mixture thereof may be used.

The dispersing agent is used to effectively disperse the conductor in the form of particle or flake. 4000 series of EFKA, Disperbyk series of BYK, Solsperse series of Avecia, TEGO Dispers series of Degussa, Disperse-AYD series of Elementis, JONCRYL series of Johnson Polymer, etc. may be used for this purpose.

The binder resin may be at least one of an acryl resin such as polyacrylic acid and polyacrylic acid ester, a cellulose resin such as ethyl cellulose, cellulose ester and cellulose nitrate, an aliphatic or copolymer polyester resin, a vinyl resin such as polyvinylbutyral, polyvinylacetate and polyvinylpyrrolidone, a polyamide resin, a polyurethane resin, a polyether resin, a urea resin, an alkyd resin, a silicone resin, a fluorine resin, an olefin resin such as polyethylene and polystyrene, a thermoplastic resin such as petroleum and rosin, an epoxy resin, an unsaturated or vinyl polyester resin, a diallylphthalate resin, a phenol resin, an oxetane resin, an oxazine resin, a bismaleimide resin, a modified silicone resin such as silicone epoxy and silicone polyester, a thermosetting resin such as melamine, an acryl resin hardened by UV or electron beam, ethylene-propylene rubber (EPR), styrene-butadiene rubber (SBR) or a natural polymer such as starch and gelatin. Besides these organic binder resins, such inorganic binder as glass resin and glass frit, a silane coupling agent such as trimethoxypropylsilane and vinyltriethoxysilane or a titanium-, zirconium- or aluminum-based coupling agent may be used.

The surfactant may be an anionic surfactant such as sodium lauryl sulfate, a nonionic surfactant such as nonylphenoxy-polyethoxyethanol and FSN of Dupont, a cationic surfactant such as laurylbenzylammonium chloride or an amphoteric surfactant such as lauryl betaine and coco betaine.

The wetting agent or wetting-dispersing agent may be polyethylene glycol, Surfynol series of Air Product or TEGO Wet series of Degussa. And, the thixotropic agent or leveling agent may be BYK series of BYK, Glide series of Degussa, EFKA 3000 series of EFKA, DSX series of Cognis, etc.

A reductant may be added to facilitate calcination. For example, hydrazine, acetic hydrazide, sodium or potassium borohydride, trisodium citrate, an amine compound such as methyldiethanolamine and dimethylamineborane, a metal salt such as ferrous chloride and iron sulfate, hydrogen, hydrogen iodide, carbon monoxide, an aldehyde compound such as formaldehyde and acetaldehyde, an organic compound such as glucose, ascorbic acid, salicylic acid, tannic acid, pyrogallol and hydroquinone, etc. may be used.

Alternatively, the conductive ink composition of the present invention may be prepared by preparing a mixture solution of the metal or metal compound represented by the formula 1 with an excess of at least one of amine compound, ammonium carbamate- or ammonium carbonate-based compound, adding a conductor, a metal precursor, a dispersing agent, a binder or an additive, as required, and then reacting the solution with carbon dioxide. This reaction may also be performed at normal pressure or applied pressure without solvent or in the presence of a solvent.

The metal complex compound according to the present invention can be expressed by the following formula 5:

$$MA_m \quad (5)$$

"A" is the compound represented by the formulas 2 to 4 and $0.5 \leq m \leq 5.5$.

The ink composition prepared in accordance with the present invention has superior stability and thus can be easily formed into film or pattern using a variety of substrates through coating or printing. For example, it may be coated or directly printed on such substrate as metal, glass, silicon wafer, ceramic, plastic film like polyester or polyimide, rubber sheet, fiber, wood and paper. The substrate may be used after washing with water, fat removal or special pre-treatment. Examples of the pre-treatment method are plasma, ion beam or corona treatment, oxidation or reduction, heating, etching, UV treatment, primer treatment using the aforementioned binder or additive, etc. Film prepration or printing may be performed by spin coating, roll coating, spray coating, dip coating, flow coating, doctor blade coating, dispensing, ink-jet printing, offset printing, screen printing, pad printing, gravure printing, flexography, stencil printing, imprinting, xerography, lithography, etc., considering the physical properties of the ink The viscosity of the ink of the present invention is not particularly limited, as long as the film formation or printing is not negatively affected. Although changeable depending on the prepration method and particular kind of the ink, a viscosity in the range from 0.1 to 1,000,000 cps is preferable and one in the range from 1 to 500,000 cps is more preferable. The viscosity of the ink becomes an important factor when film or pattern formation is performed by ink-jet printing. In such case, a viscosity in the range from 0.1 to 50 cps, preferably in the range from 1 to 20 cps, more preferably in the range from 2-15 cps, is favorable. If the viscosity is smaller, conductivity may be not enough because of insufficient film thickness. In contrast, if the viscosity is larger, the ink may not easily flow.

Such prepared film or pattern may be post-treated by oxidation or reduction, heat treatment, IR, UV, electron beam or laser treatment, etc. for metal or metal oxide pattern formation. The heat treatment may be performed under inert gas atmosphere, or in air, nitrogen or carbon monoxide or in a mixture gas comprising hydrogen and air or other inert gas, depending on the need. The heat treatment is usually performed at 80-500° C., preferably at 90-300° C., more preferably at 100-250° C., for better physical properties of the film. The heat treatment may be performed at different temperatures for film uniformity. For example, the heat treatment may be performed at 80-150° C. for 1-30 minutes, and then at 150-300° C. for 1-30 minutes.

The present invention provides a variety of conductive ink compositions comprising a metal complex compound obtained by reacting at least one metal or metal compound represented by the formula 1 with at least one ammonium carbamate- or ammonium carbonate-based compound represented by the formula 2, 3 or 4 and an additive.

The ink composition of the present invention has superior stability and solubility, enables easy film formation and is readily calcined even at low temperature of 200° C. or belowto form film or pattern with good conductivity. The ink composition of the present invention may be coated or directly printed on a variety of substrates, including metal, glass, silicon wafer, ceramic, plastic film like polyester or polyimide, rubber sheet, fiber, wood and paper. Depending on the physical properties of the ink, a variety of film formation or printing methods, such as spin coating, roll coating, spray coating, dip coating, flow coating, doctor blade coating and dispensing, ink-jet printing, offset printing, screen printing, pad printing, gravure printing, flexography, stencil printing, imprinting, xerography, lithography, etc. are applicalbe.

Use of the ink composition of the present invention enables formation of uniform film having supeiror conductivity and adhesivity. Moreover, the film is hardly cracked.

In addition, the ink composition of the present invention may be used in EMI shielding materials, conductive adhesives, low-resistance metal wirings, PCBs, FPCs, antennas for RFID tags, solar cells, secondary cells or fuel cell and electrodes or wirings of PDPs, TFT-LCDs, OLEDs, flexible displays and OTFTs.

BEST MODE FOR CARRYING OUT THE INVENTION

Hereinafter, the present invention is described in further detail referring to the examples. However, it will be appreciate that those skilled in the art, in consideration of this disclosure, may make modifications and improvements within the spirit and scope of the present invention.

Example 1

Figure 1:
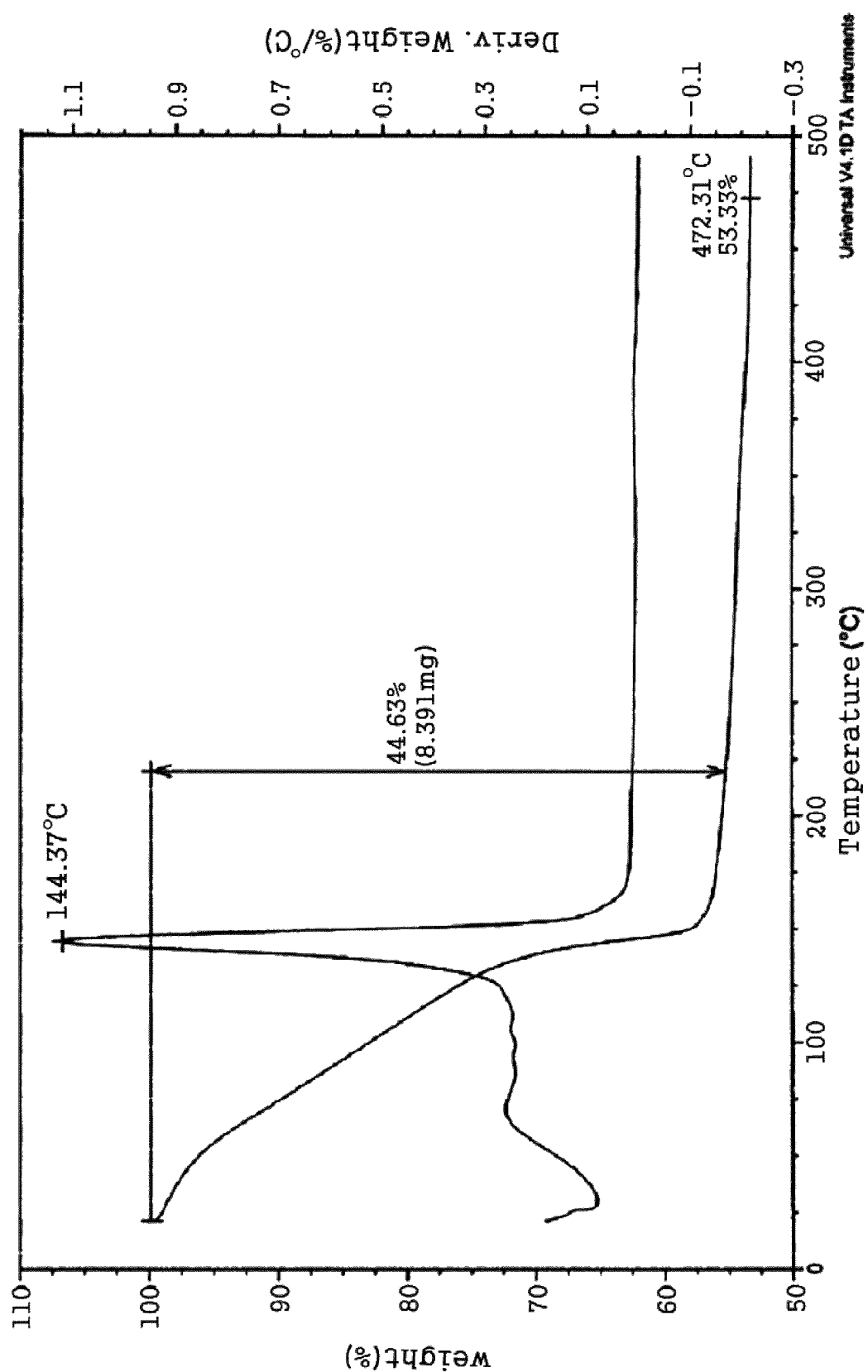
FIG. 1 is the TGA (thermogram) for the metal ink composition of Example 1.
Figure 2:
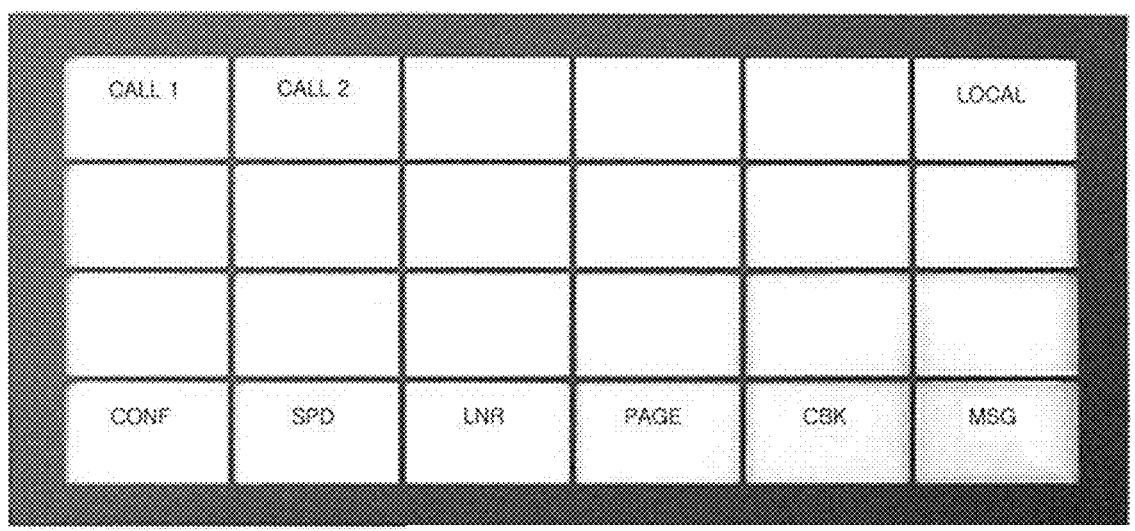
FIG. 2 is the pattern silk-screen printed on PET film using the metal ink composition of Example 1.

9.52 g (31.48 mmol) of 2-ethylhexylammonium 2-ethylhexylcarbamate, a viscous liquid, was dissolved in a mixture solution comprising 10.00 mL of methanol and 3.00 mL of aqueous solution in a 50 mL Schlenk flask equipped with a stirrer. Then, 1.00 g (15.74 mmol) of copper powder (Aldrich, particle size=1-5 microns) was added and reaction was performed at room temperature for 30 minutes under oxygen bubbling. As the reaction proceeded, the reaction mixture turned into a dark brown slurry and finally into a blue, transparent solution. The solvent was removed from the reaction solution in vacuum to obtain 7.15 g of a blue copper complex compound. Thermogravimetirc analysis (TGA) confirmed that the copper content was 11.28 wt %. To 3.00 g of the copper complex compound were added 5.00 g of copper flake (TSC-20F, Chang Sung) 0.20 g of polyvinylbutyral (BS-18, Wacker), a binder, dissolved in 1.80 g of butylcarbitol. After 10 minutes of stirring, the mixture was passed through a three-roll mill (Drais Mannheim) for 5 times to obtain a conductive ink composition having a viscosity of 72,600 cps. Thermogravimetric analysis confirmed that the metal content was 53.33 wt % (see FIG. 1). The ink composition was coated on PET film under nitrogen atmosphere using a silk-screen printer patterned to 325 meshes to obtain a uniform and precise film, which was calcined at the temperature given in Table 1 below to obtain the pattern shown in FIG. 2. Conductivity (planar resistance) and adhesivity of the film are given in Table 1.

Example 2

6.99 g (31.48 mmol) of 3-methoxypropylammonium 3-methoxypropylcarbamate, a viscous liquid, was dissolved in 2.00 g of a mixture solution comprising 5.00 mL of methanol and 50 wt % aqueous hydrogen peroxide($H_2O_2$) solution in a 50 mL Schlenk flask equipped with a stirrer. Then, 1.00 g (15.74 mmol) of metallic copper was added and reaction was performed at room temperature for 2 hours. As the reaction proceeded, the reaction mixture turned into a brown slurry and finally into a blue, transparent solution. The solvent was removed from the reaction solution in vacuum to obtain 5.58 g of a blue copper complex compound. Thermogravimetirc analysis (TGA) confirmed that the copper content was 16.26 wt %. 1.00 g of the copper complex compound was dissolved, by adding 1.00 g methanol. Then, 8.00 g of a complex compound obtained by reacting a 1:1 (molar ratio) mixture of 2-ethylhexylammonium 2-ethylhexyl carbamate and 2-methoxyethylammonium 2-methoxyethylcarbamate with silver oxide (silver content=22.00 wt %) to obtain a transparent ink composition having a viscosity of 50.7 cps. The ink composition was coated under nitrogen atmosphere to obtain a uniform and precise film, which was calcined at the temperature given in Table 1. Conductivity (planar resistance) and adhesivity of the film are given in Table 1.

Example 3

7.53 g (41.88 mmol) of isopropyl ammonium isopropylcarbonate was dissolved in 1.89 g of a mixture solution comprising 20.00 mL of methanol and 50 wt % aqueous hydrogen peroxide($H_2O_2$) solution in a 50 mL Schlenk flask equipped with a stirrer. Then, 1.00 g (6.98 mmol) of copper oxide (I) was added and reaction was performed at room temperature for 2 hours. As the reaction proceeded, the reaction mixture turned into a brown slurry and finally into a blue, transparent solution. The solvent was removed from the reaction solution in vacuum to obtain 6.28 g of a blue copper complex compound. Thermogravimetirc analysis (TGA) confirmed that the copper content was 14.17 wt %. 3.00 g of the copper complex compound was added to 2.80 g of a transparent butylcellosolve solution in which 4.00 g of silver flake (EA0295, Chemet) and 0.20 g of polyvinylbutyral (Wacker), a binder, were dissolved. After 10 minutes of stirring, the solution was passed through a three-roll mill for 5 times to obtain a conductive ink composition having a viscosity of 350.4 cps. The ink composition was coated under nitrogen atmosphere to obtain a uniform and precise film, which was calcined at the temperature given in Table 1. Conductivity (planar resistance) and adhesivity of the film are given in Table 1.

Example 4

6.79 g (41.88 mmol) of isopropyl ammonium isopropylcarbamate was dissolved in 1.89 g of a mixture solution comprising 20.00 mL of methanol and 50 wt % aqueous hydrogen peroxide($H_2O_2$) solution in a 50 mL Schlenk flask equipped with a stirrer. Then, 1.00 g (6.98 mmol) of copper oxide (I) was added and reaction was performed at room temperature for 2 hours. As the reaction proceeded, the reaction mixture turned into a brown slurry and finally into a blue, transparent solution. The solvent was removed from the reaction solution in vacuum to obtain 6.35 g of a blue copper complex compound. Thermogravimetirc analysis (TGA) confirmed that the copper content was 14.61 wt %. 2.00 g of the copper complex compound was added to a solution in which 1.00 g of methanol and 1.00 g of 2-ethylhexylamine were dissolved in 6.00 g of silver acetate. After 10 minutes of stirring, a transparent ink composition having a viscosity of 26.7 cps was obtained. The ink composition was coated under nitrogen atmosphere to obtain a uniform and precise film, which was calcined at the temperature given in Table 1. Conductivity (planar resistance) and adhesivity of the film are given in Table 1.

Example 5

11.56 g (38.22 mmol) of 2-ethylhexylammonium 2-ethylhexylcarbamate, a viscous liquid, was dissolved in 5.00 mL of acetonitrile and 10.00 mL of methanol in a 50 mL Schlenk flask equipped with a stirrer. Then, 1.00 g (15.29 mmol) of zinc powder (Aldrich, particle size =100 meshes or smaller) was added and reaction was performed at room temperature for 10 hours. As the reaction proceeded, the reaction mixture turned into a gray slurry and finally into a colorless, transparent solution. The solvent was removed from the reaction solution in vacuum to obtain 11.87 g of a white zinc complex compound. Thermogravimetirc analysis (TGA) confirmed that the zinc content was 14.78 wt %. 2.00 g of the zinc complex compound was added to 2.80 g of a transparent methylcellosolve solution in which 5.00 g of silver flake (Chemet) and 0.20 g of polyvinylbutyral (Wacker), a binder, were dissolved. After 10 minutes of stirring, the solution was passed through a three-roll mill for 5 times to obtain a conductive ink composition having a viscosity of 1,260 cps. The ink composition was coated under nitrogen atmosphere to obtain a uniform and precise film, which was calcined at the temperature given in Table 1. Conductivity (planar resistance) and adhesivity of the film are given in Table 1.

Example 6

6.63 g (36.84 mmol) of isopropylammonium isopropylbicarbonate was dissolved in 7.00 mL of a 14 wt % ammonia aqueous solution in a 50 mL Schlenk flask equipped with a stirrer. Then, 1.00 g (12.28 mmol) of zinc oxide (II) was added and reaction was performed at room temperature for 2 hours. As the reaction proceeded, the reaction mixture turned into a white slurry and finally into a colorless, transparent solution. The solvent was removed from the reaction solution in vacuum to obtain 5.52 g of a white zinc complex compound. Thermogravimetirc analysis (TGA) confirmed that the zinc content was 15.20 wt %. 1.00 g of the zinc complex compound was added to a solution in which 7.00 g of a silver complex compound prepared by reacting isopropylammonium isopropylcarbonate with silver oxide (silver content=36.45 wt %) was dissolved in 2.00 g of methanol. After 10 minutes of stirring, a transparent ink composition having a viscosity of 27.4 cps was obtained. The ink composition was coated under nitrogen atmosphere to obtain a uniform and precise film, which was calcined at the temperature given in Table 1. Conductivity (planar resistance) and adhesivity of the film are given in Table 1.

Example 7

1.00 g (7.71 mmol) of hydrated nickel chloride (II)-6 was dissolved in 5.00 mL of an aqueous solution in a 50 mL Schlenk flask equipped with a stirrer. Then, a solution in which 5.83 g (19.27 mmol) of 2-ethylhexylammonium 2-ethylhexylcarbamate, a viscous liquid, was dissolved in 10.00 mL of benzene was added and reaction was performed at room temperature for 2 hours while vigorously stirring the solution. As the reaction proceeded, the reaction mixture turned into a green slurry and finally turned white. The colorless, transparent aqueous phase was separated from the green, transparent organic phase. The solvent was removed from the organic phase in vacuum to obtain 4.73 g of an emerald green nickel complex compound. Thermogravimetirc analysis (TGA) confirmed that the zinc content was 14.51 wt %. 1.00 g of the nickel complex compound was added to a solution in which 6.00 g of a silver complex compound prepared by reacting 2-ethylhexylammonium 2-ethylhexylcarbamate with silver oxide (silver content=22.00 wt %) was dissolved in 3.00 g of methanol. After 10 minutes of stirring, a transparent ink composition having a viscosity of 127.2 cps was obtained. The ink composition was coated under nitrogen atmosphere to obtain a uniform and precise film, which was calcined at the temperature given in Table 1. Conductivity (planar resistance) and adhesivity of the film are given in Table 1.

Example 8

1.00 g (7.70 mmol) of hydrated cobalt chloride (II)-6 was dissolved in 5.00 mL of an aqueous solution in a 50 mL Schlenk flask equipped with a stirrer. Then, a solution in which 5.82 g (19.25 mmol) of 2-ethylhexylammonium 2-ethylhexylcarbamate, a viscous liquid, was dissolved in 10.00 mL of toluene was added and reaction was performed at room temperature for 2 hours while vigorously stirring the solution. As the reaction proceeded, the reaction mixture turned into a red slurry and finally turned purple. The colorless, transparent aqueous phase was separated from the purple, transparent organic phase. The solvent was removed from the organic phase in vacuum to obtain 5.36 g of a purple cobalt complex compound. Thermogravimetirc analysis (TGA) confirmed that the cobalt content was 14.51 wt %. 1.00 g of the cobalt complex compound was added to a solution in which 6.00 g of a silver complex compound prepared by reacting 2-ethylhexylammonium 2-ethylhexylcarbamate with silver oxide (silver content=22.00 wt %) was dissolved in 3.00 g of methanol. After 10 minutes of stirring, a transparent ink composition having a viscosity of 347.2 cps was obtained. The ink composition was coated under nitrogen atmosphere to obtain a uniform and precise film, which was calcined at the temperature given in Table 1. Conductivity (planar resistance) and adhesivity of the film are given in Table 1.

Example 9

2.62 g (16.18 mmol) of isopropylammonium isopropylcarbamate was dissolved in 5.00 mL of methanol in a 50 mL Schlenk flask equipped with a stirrer. Then, 1.00 g (0.81 mmol) of hydrated ammonium molybdate (VI)-4 ($(NH_4)_6Mo_7O_{24}$-$4H_2O$) was added and reaction was performed at room temperature for 10 hours. As the reaction proceeded, the reaction mixture turned into a green slurry and finally into a colorless, transparent solution. The solvent was removed from the reaction solution in vacuum to obtain 3.02 of a white molybdenum complex compound. Thermogravimetirc analysis (TGA) confirmed that the molybdenum content was 16.62 wt %. 2.00 g of the molybdenum complex compound was added to 2.80 g of a transparent butylcellosolve solution in which 5.00 g of silver flake and 0.20 g of polyvinylbutyral, a binder, were dissolved. After 10 minutes of stirring, the solution was passed through a three-roll mill for 5 times to obtain a conductive ink composition having a viscosity of 940.8 cps. The ink composition was coated under nitrogen atmosphere to obtain a uniform and precise film, which was calcined at the temperature given in Table 1. Conductivity (planar resistance) and adhesivity of the film are given in Table 1.

Example 10

8.92 g (55.5 mmol) of isopropylammonium isopropylcarbamate was dissolved in 5.00 mL of methanol in a 50 mL Schlenk flask equipped with a stirrer. Then, 1.00 g (5.50 mmol) of vanadium oxide (V) was added and reaction was performed at room temperature for 10 hours. As the reaction proceeded, the reaction mixture turned into a yellow slurry and finally into a colorless, transparent solution. The solvent was removed from the reaction solution in vacuum to obtain 9.35 of a white vanadium complex compound. Thermogravimetirc analysis (TGA) confirmed that the vanadium content was 12.37 wt %. 2.00 g of the vanadium complex compound was added to 2.80 g of a transparent butylcellosolve solution in which 5.00 g of silver flake and 0.20 g of polyvinylbutyral, a binder, were dissolved. After 10 minutes of stirring, the solution was passed through a three-roll mill for 5 times to obtain a conductive ink composition having a viscosity of 1,540 cps. The ink composition was coated under nitrogen atmosphere to obtain a uniform and precise film, which was calcined at the temperature given in Table 1. Conductivity (planar resistance) and adhesivity of the film are given in Table 1.

Example 11

7.65 g (25.31 mmol) of 2-ethylhexylammonium 2-ethylhexylcarbamate, a viscous liquid, was dissolved in 5.00 mL of ethyl acetate in a 50 mL Schlenk flask equipped with a stirrer. Then, 1.00 g (2.53 mmol) of bismuth nitrate (III) was added and reaction was performed at room temperature for 2 hours. As the reaction proceeded, the reaction mixture turned into a white slurry and finally into a colorless, transparent solution. The solvent was removed from the reaction solution in vacuum to obtain 5.16 of a white bismuth complex compound. Thermogravimetirc analysis (TGA) confirmed that the bismuth content was 11.35 wt %. 2.00 g of the bismuth complex compound was added to 2.80 g of a transparent butylcellosolve solution in which 5.00 g of silver flake and 0.20 g of polyvinylbutyral, a binder, were dissolved. After 10 minutes of stirring, the solution was passed through a three-roll mill for 5 times to obtain a conductive ink composition having a viscosity of 1,620 cps. The ink composition was coated under nitrogen atmosphere to obtain a uniform and precise film, which was calcined at the temperature given in Table 1. Conductivity (planar resistance) and adhesivity of the film are given in Table 1.

Example 12

1.00 g (5.64 mmol) of palladium chloride (II) was dissolved in 5.00 mL of an aqueous solution in a 50 mL Schlenk flask equipped with a stirrer. Then, a solution in which 1.71 g (16.92 mmol) of 2-ethylhexylammonium 2-ethylhexylcarbamate, a viscous liquid, was dissolved in 5.00 mL of ethyl acetate was added and reaction was performed at room temperature for 2 hours while vigorous stirring the solution. As the reaction proceeded, the reaction mixture turned into a red slurry and finally turned colorless. The colorless, transparent aqueous phase was separated from the colorless, transparent organic phase. The solvent was removed from the organic phase in vacuum to obtain 2.22 of a yellow, transparent palladium complex compound. Thermogravimetirc analysis (TGA) confirmed that the palladium content was 10.80 wt %. 2.00 of the palladium complex compound was added to 0.50 g of methanol After 10 minutes of stirring, a transparent ink composition having a viscosity of 25.6 cps was obtained. The ink composition was coated under nitrogen atmosphere to obtain a uniform and precise film, which was calcined at the temperature given in Table 1. Conductivity (planar resistance) and adhesivity of the film are given in Table 1.

Example 13

2.00 g of a silver complex compound prepared by reacting 2-ethylhexylammonium 2-ethylhexylcarbamate with silver oxide (silver content=22.00 wt %) was dissolved in 10.00 mL of ethyl acetate in a 50 mL Schlenk flask equipped with a stirrer. Then, a solution in which 1.71 g (16.92 mmol) of 2-ethylhexylammonium 1.38 g (4.08 mmol) of hydrogen chloroaurate was added and reaction was performed at room temperature for 1 hour while stirring the solution. As the reaction proceeded, white precipitate was formed and a yellow, transparent solution was obtained as supernatant. The solvent was removed from the supernatant in vacuum to obtain 3.56 g of a yellow gold complex compound. Thermogravimetirc analysis (TGA) confirmed that the gold content was 31.26 wt %. 3.30 of the gold complex compound was added to a solution in which 2.70 g of a silver complex compound prepared by reacting isopropylammonium isopropylcarbonate with silver oxide (silver content=36.45 wt %) was dissolved in 2.50 g of methanol and 1.50 g of 2-ethylhexylamine. After 10 minutes of stirring, a transparent ink composition having a viscosity of 97.4 cps was obtained. The ink composition was coated under nitrogen atmosphere to obtain a uniform and precise film, which was calcined at the temperature given in Table 1. Conductivity (planar resistance) and adhesivity of the film are given in Table 1.

Example 14

1.50 g of the 2-ethylhexylammonium palladium complex compound prepared in Example 12 was added to a solution in which 6.20 g of a silver complex compound prepared by reacting 2-ethylhexylcarbamate with silver oxide (silver content=22.00 wt %) was dissolved in 2.30 g of methanol. After 10 minutes of stirring, a transparent ink composition having a viscosity of 83.2 cps was obtained. The ink composition was coated under nitrogen atmosphere to obtain a uniform and precise film, which was calcined at the temperature given in Table 1. Conductivity (planar resistance) and adhesivity of the film are given in Table 1.

Example 15

Figure 3:
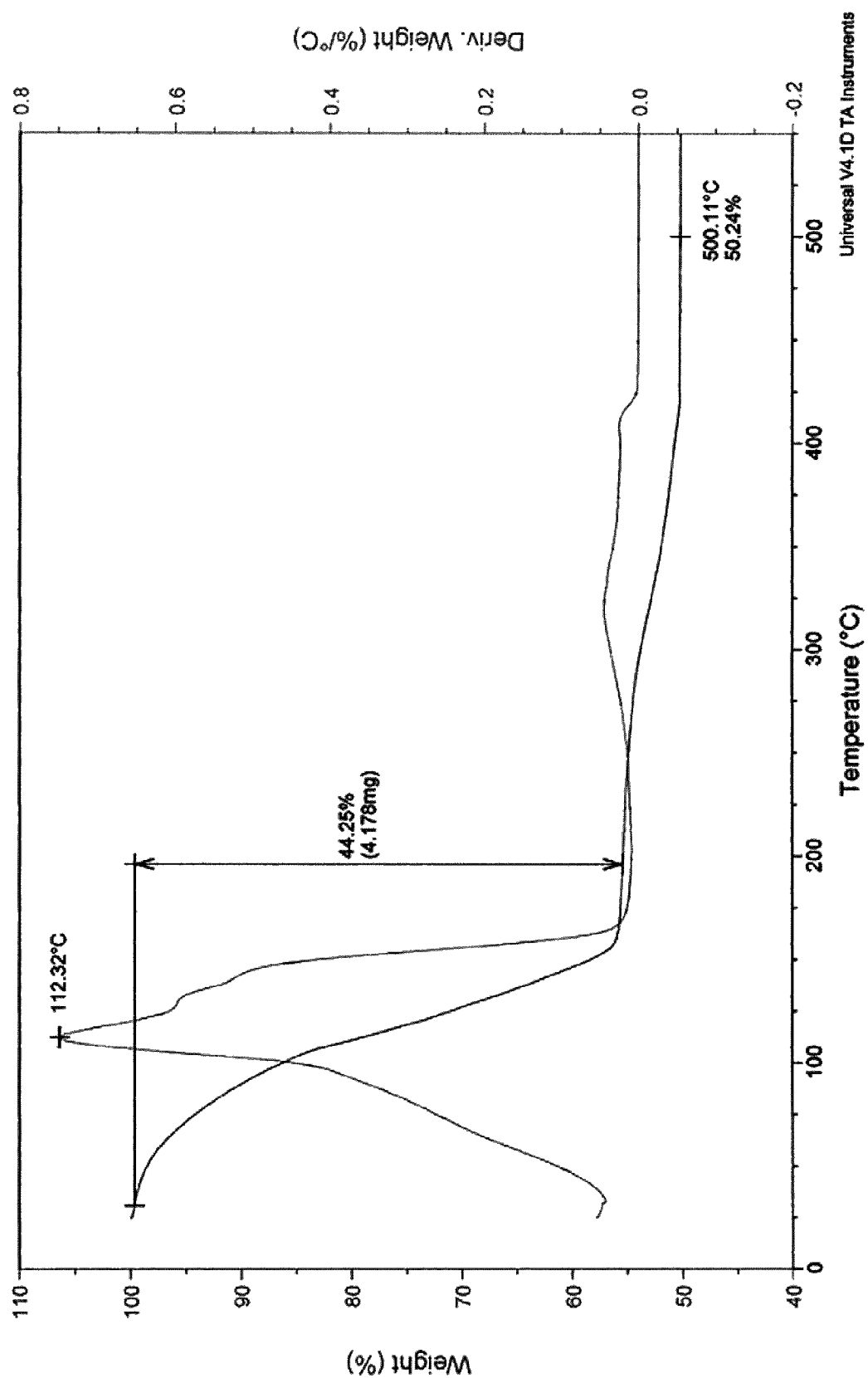
FIG. 3 is the TGA for the conductive ink composition of Example 15.
Figure 4:
FIG. 4 is the pattern silk-screen printed on PET film using the ink composition of Example 15.
Figure 5:
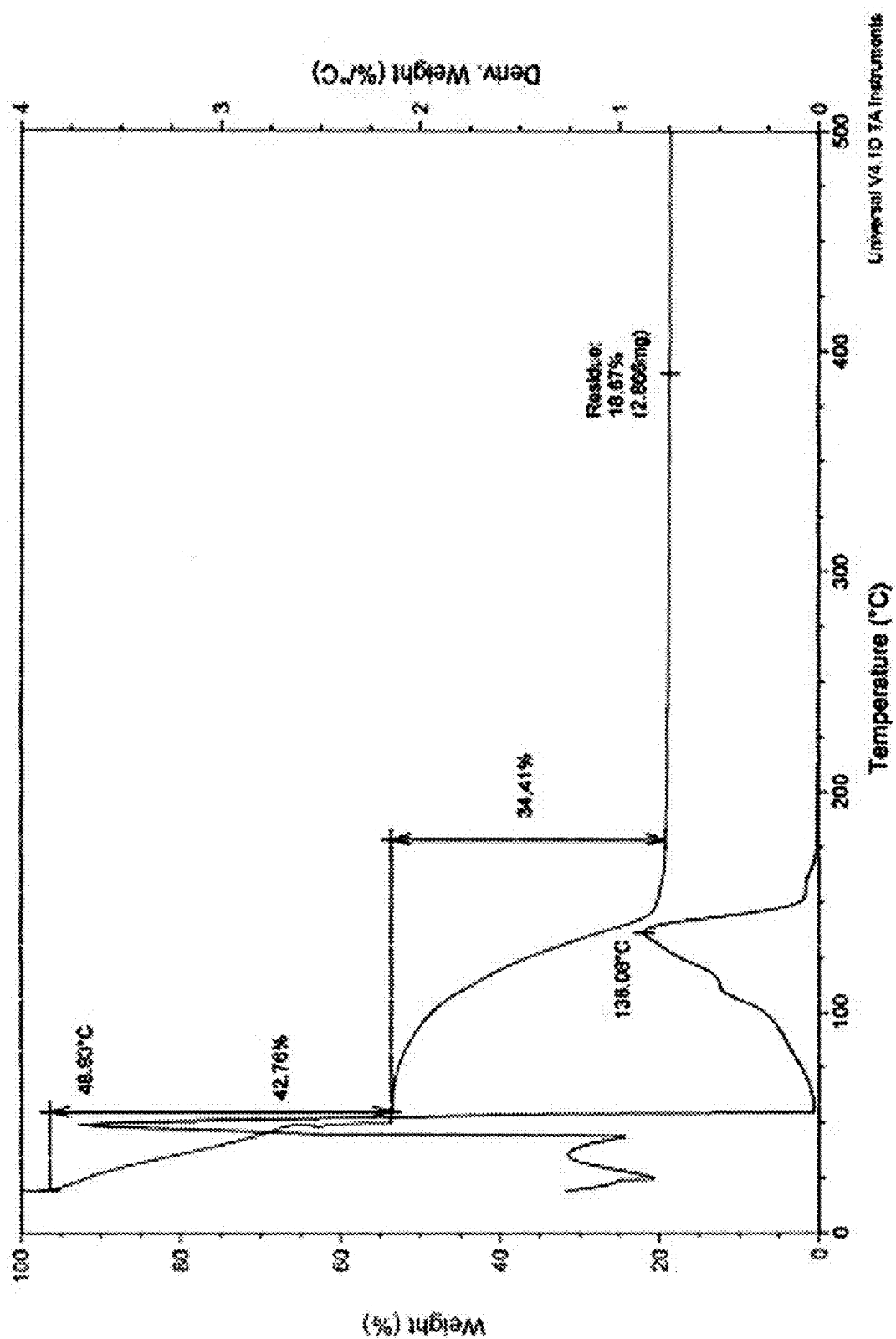
FIG. 5 is the TGA for the ink composition of Example 52.
Figure 6:
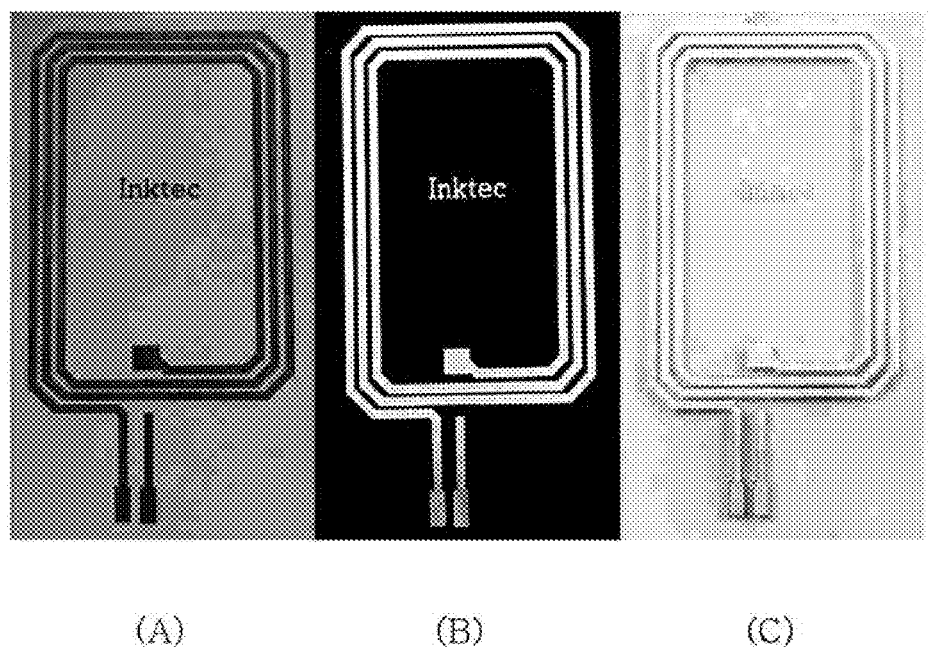
FIG. 6 is the pattern ink-jet printed using the ink composition of Example 82.

33.7 g (141.9 mmol) of a viscous lquid mixture of 2-ethylhexylammonium 2-ethylhexyl carbamate and 2-methoxyethylammonium 2-methoxyethylcarbamate (molar ratio=4: 6) was put in a 250 mL Schlenk flask equipped with a stirrer. Then, 10.0 g (43.1 mmol) of silver oxide was added and reaction was performed at room temperature for 2 hours while stirring the solution. At first, a black slurry was obtained, but as the complex was formed, the color faded gradually. Finally, 43.7 g of a yellow, transparent silver complex compound having a viscosity of 0.31 Pa·s was obtained in liquid phase. Thermogravimetirc analysis (TGA) confirmed that the silver content was 22.0 wt %. 40.9 of the silver complex compound was added to 12.9 g of a transparent butylcarbitol solution in which 41.2 g of silver flake (EA0295, Chemet) and 5.0 g of polyvinylbutyral (BS-18, Wacker), a binder, were dissolved. After 10 minutes of stirring, the solution was passed through a three-roll mill (Drais Mannheim) for 5 times. As seen in FIG. 3, a conductive ink composition having a silver content of 50.2 wt % and a viscosity of 3.94 Pa·s was obtained. The ink composition was coated on PET film using a silk-screen printer (see FIG. 4). The resultant uniform and precise film was calcined at the temperature given in Table 1. Conductivity (planar resistance) and adhesivity of the film are given in Table 1.

Example 16

An ink composition having a viscosity of 5.74 Pa·s was prepared in the same manner as in Example 15 using 40.0 g of a silver complex compound prepared in the same manner as in Example 15 and 41.2 g of silver powder (SNG-PSN-100-99, SOLNANOGY, average particle size=150 nm), instead of 41.2 g of silver flake. The ink composition was coated in the same manner as in Example 15 and the resultant uniform and precise film was calcined. Conductivity (planar resistance) and adhesivity of the film are given in Table 1.

Example 17

An ink composition having a viscosity of 148.13 Pa·s was prepared in the same manner as in Example 15 using 40.0 g of a silver complex compound prepared in the same manner as in Example 15 and 41.2 g of copper flake (TSC-20F, Chang Sung), instead of 41.2 g of silver flake. The ink composition was coated in the same manner as in Example 15 and the resultant uniform and precise film was calcined. Conductivity (planar resistance) and adhesivity of the film are given in Table 1.

Example 18

An ink composition having a viscosity of 14.55 Pa·s was prepared in the same manner as in Example 15 using 40.0 g of a silver complex compound prepared in the same manner as in Example 15 and 41.2 g of copper powder (Aldrich, average particle size=3 microns), instead of 41.2 g of silver flake. The ink composition was coated in the same manner as in Example 15 and the resultant uniform and precise film was calcined. Conductivity (planar resistance) and adhesivity of the film are given in Table 1.

Example 19

An ink composition having a viscosity of 11.74 Pa·s was prepared in the same manner as in Example 15 using 40.0 g of a silver complex compound prepared in the same manner as in Example 15 and 41.2 g of nickel powder (Aldrich, average particle size=3 microns), instead of 41.2 g of silver flake. The ink composition was coated in the same manner as in Example 15 and the resultant uniform and precise film was calcined. Conductivity (planar resistance) and adhesivity of the film are given in Table 1.

Example 20

An ink composition having a viscosity of 10.65 Pa·s was prepared in the same manner as in Example 15 using 40.0 g of a silver complex compound prepared in the same manner as in Example 15 and 41.2 g of 30 wt % silver-coated copper powder (SNG-SN100-30, SOLNANOGY, average particle size=100 nm), instead of 41.2 g of silver flake. The ink composition was coated in the same manner as in Example 15 and the resultant uniform and precise film was calcined. Conductivity (planar resistance) and adhesivity of the film are given in Table 1.

Example 21

40.0 g of a silver complex compound prepared in the same manner as in Example 15 and 41.2 g of silver flake were added to a transparent mixture solution in which 2.0 g of ethylcellulose (Aldrich), a binder, was dissolved in 6.8 g of methylcellosolve and 5.0 g of of benzylamine. After 10 minutes of stirring, 5.0 g of carbon powder (Vulcan-XC72, Cabot) was further added. After 5 minutes of stirring, the solution was passed through a three-roll mill for 7 times to obtain an ink composition having a viscosity of 3.75 Pa·s. The ink composition was coated in the same manner as in Example 15 and the resultant uniform and precise film was calcined. Conductivity (planar resistance) and adhesivity of the film are given in Table 1.

Example 22

An ink composition having a viscosity of 2.64 Pa·s was prepared in the same manner as in Example 21 using 5.0 g of graphite powder (CGF-t2N5, Alfaproducts) instead of 5.0 g of carbon powder. The ink composition was coated in the same manner as in Example 15 and the resultant uniform and precise film was calcined. Conductivity (planar resistance) and adhesivity of the film are given in Table 1.

Example 23

An ink composition having a viscosity of 4.32 Pa·s was prepared in the same manner as in Example 21 using 5.0 g of nickel powder (Aldrich, average particle size=3 microns) instead of 5.0 g of carbon powder. The ink composition was coated in the same manner as in Example 15 and the resultant uniform and precise film was calcined. Conductivity (planar resistance) and adhesivity of the film are given in Table 1.

Example 24

An ink composition having a viscosity of 4.54 Pa·s was prepared in the same manner as in Example 21 using 5.0 g of copper powder (Aldrich, average particle size=3 microns) instead of 5.0 g of carbon powder. The ink composition was coated in the same manner as in Example 15 and the resultant uniform and precise film was calcined. Conductivity (planar resistance) and adhesivity of the film are given in Table 1.

Example 25

40.0 g of a silver complex compound prepared in the same manner as in Example 15, 20.6 g of silver flake (EA0295, Chemet) and 20.6 g of silver powder (SNG-PSN-100-99, SOLNANOGY, average particle size=150 nm) were added to a transparent mixture solution in which 3.0 g of polyvinylbutyral (BS-18, Wacker), a binder, was dissolved in 15.8 g of butylcellosolve. After 10 minutes of stirring, the solution was passed through a three-roll mill for 5 times to obtain an ink composition having a viscosity of 3.56 Pa·s. The ink composition was coated in the same manner as in Example 15 and the resultant uniform and precise film was calcined. Conductivity (planar resistance) and adhesivity of the film are given in Table 1.

Example 26

40.0 g of a silver complex compound prepared in the same manner as in Example 15, 20.6 g of copper flake (TSC-20F, Chang Sung) and 20.6 g of copper powder (Aldrich, average particle size=3 micron) were added to a transparent mixture solution in which 3.0 g of polyvinylbutyral (BS-18, Wacker), a binder, was dissolved in 15.8 g of butylcellosolve. After 10 minutes of stirring, the solution was passed through a three-roll mill for 5 times to obtain an ink composition having a viscosity of 227.87 Pa·s. The ink composition was coated in the same manner as in Example 15 and the resultant uniform and precise film was calcined. Conductivity (planar resistance) and adhesivity of the film are given in Table 1.

Example 27

40.0 g of a silver complex compound prepared in the same manner as in Example 15, 20.6 g of silver flake (EA0295, Chemet) and 20.6 g of copper flake (TSC-20F, Chang Sung) were added to a transparent mixture solution in which 3.0 g of polyvinylbutyral (BS-18, Wacker), a binder, was dissolved in 15.8 g of butylcellosolve. After 10 minutes of stirring, the solution was passed through a three-roll mill for 5 times to obtain an ink composition having a viscosity of 4.15 Pa·s. The ink composition was coated in the same manner as in Example 15 and the resultant uniform and precise film was calcined. Conductivity (planar resistance) and adhesivity of the film are given in Table 1.

Example 28

40.0 g of a silver complex compound prepared in the same manner as in Example 15 and 41.2 g of silver flake (EA0295, Chemet) were added to a solution in which 1.2 g of dipentaerythritol hexacrylate, a monomer, 3.5 g EB657 (UCB, Mw=1500), an oligomer, 0.1 g of 819 (Ciba Specialty Chemicals) and 0.2 g of 1173 (Ciba Specialty Chemicals), photoinitiators, and 0.5 g of Solsperse20000 (Avecia), a dispersing agent, were dissolved in 13.8 g of ethylcellosolve. After 10 minutes of stirring, the solution was passed through a three-roll mill for 5 times to obtain an ink composition having a viscosity of 10.67 Pa·s. The ink composition was coated on a glass plate and a film was obtained by UV curing at 600 mJ/cm$^2$. The resultant film was calcined at the temperature given in Table 1. Conductivity (planar resistance) and adhesivity of the film are given in Table 1.

Example 29

40.0 g of a silver complex compound prepared in the same manner as in Example 15 and 41.2 g of silver flake (EA0295, Chemet) were added to a solution in which 4.5 g of unsaturated polyester (Polycoat, Aekyung Chemical), 0.5 g of benzoyl peroxide and 0.5 g of EFKA4510 (EFKA), a dispersing agent, were dissolved in 3.0 g of 2-pyrrolidone and 10.3 g of ethylcellosolve. After 10 minutes of stirring, the solution was passed through a three-roll mill for 5 times to obtain an ink composition having a viscosity of 3.17 Pa·s. The ink composition was coated on a glass plate and a film was obtained by UV curing at 600 mJ/cm$^2$. The resultant film was calcined at the temperature given in Table 1. Conductivity (planar resistance) and adhesivity of the film are given in Table 1.

Example 30

40.0 g of a silver complex compound prepared in the same manner as in Example 15 and 41.2 g of silver flake (EA0295, Chemet) were added to a solution in which 2.0 g of resol (TD-2207, Kangnam Chemical) was dissolved in 16.8 g of ethylcellosolve. After 10 minutes of stirring, the solution was passed through a three-roll mill for 5 times to obtain an ink composition having a viscosity of 3.05 Pa·s. The ink composition was coated on a glass plate and the resultant film was calcined at the temperature given in Table 1. Conductivity (planar resistance) and adhesivity of the film are given in Table 1.

Example 31

40.0 g of silver flake (EA0295, Chemet) was added to a transparent solution in which 1.0 g of polyvinylbutyral (BS-18, Wacker) was dissolved in 9.0 g of butylcarbitol. A paste was prepared by stirring the solution for 10 minutes. 50.0 g of a silver complex compound in liquid phase prepared in the same manner as in Example 15 was added. After 10 minutes of stirring, the solution was passed through a three-roll mill for 5 times to obtain an ink composition having a viscosity of 3.88 Pa·s. The ink composition was coated on PET film and the resultant film was calcined at the temperature given in Table 1. Conductivity (planar resistance) and adhesivity of the film are given in Table 1.

Example 32

40.0 g of a silver complex compound prepared in the same manner as in Example 15 and 41.2 g of silver flake were added to a transparent solution in which 5.0 g of polyvinylbutyral (BS-18, Wacker), a binder, and 1.0 g of EFKA4330 (EFKA), a dispersing agent, were dissolved in 12.8 g of methoxypropyl acetate. After 10 minutes of stirring, the solution was passed through a three-roll mill for 5 times to obtain an ink composition having a viscosity of 1.18 Pa·s. The ink composition was coated on PET film and the resultant film was calcined at the temperature given in Table 1. Conductivity (planar resistance) and adhesivity of the film are given in Table 1.

Example 33

40.0 g of a silver complex compound prepared in the same manner as in Example 15 and 41.2 g of silver flake (EA0295, Chemet) were added to a solution in which 5.0 g of polyvinylbutyral (BS-18, Wacker), a binder, was dissolved in 13.8 g of tetrahydrofuran. After 10 minutes of stirring, the solution was passed through a three-roll mill for 5 times to obtain an ink composition having a viscosity of 1.45 Pa·s. The ink composition was coated on PET film and the resultant film was calcined at the temperature given in Table 1. Conductivity (planar resistance) and adhesivity of the film are given in Table 1.

Example 34

40.0 g of a silver complex compound prepared in the same manner as in Example 15 and 41.2 g of silver flake (EA0295, Chemet) were added to a transparent solution in which 5.0 g of acryl (HPD671, Johnson Polymer), a binder, was dissolved in 13.8 g of butylcarbitol. After 10 minutes of stirring, the solution was passed through a three-roll mill for 5 times to obtain an ink composition having a viscosity of 0.75 Pa·s. The ink composition was coated on PET film and the resultant film was calcined at the temperature given in Table 1. Conductivity (planar resistance) and adhesivity of the film are given in Table 1.

Example 35

40.0 g of a silver complex compound prepared in the same manner as in Example 15 and 51.2 g of silver flake (EA0295, Chemet) were added to a solution in which 3.0 g of polyvinylbutyral (BS-18, Wacker), a binder, was dissolved in 5.8 g of butylcarbitol. After 10 minutes of stirring, the solution was passed through a three-roll mill for 5 times to obtain an ink composition having a viscosity of 4.35 Pa·s. The ink composition was coated on PET film and the resultant film was calcined at the temperature given in Table 1. Conductivity (planar resistance) and adhesivity of the film are given in Table 1.

Example 36

35.0 g of a silver complex compound prepared in the same manner as in Example 15 and 583 g of silver flake (EA0295, Chemet) were added to a solution in which 3.0 g of polyvinylbutyral (BS-18, Wacker), a binder, was dissolved in 3.7 g of butylcarbitol. After 10 minutes of stirring, the solution was passed through a three-roll mill for 5 times to obtain an ink composition having a viscosity of 6.24 Pa·s. The ink composition was coated on PET film and the resultant film was calcined at the temperature given in Table 1. Conductivity (planar resistance) and adhesivity of the film are given in Table 1.

Example 37

31.00 g (163.4 mmol) of a mixture of isopropylammonium isopropylcarbamate and 2-methoxyethylammonium 2-methoxyethylcarbamate (molar ratio=7:3) was dissolved in a mixture solution of 40.0 g of methanol and 20.5 g (158 6 mmol) of 2-ethylhexylamine in a 250 mL Schlenk flask equipped with a stirrer. Then, 10.0 g (43.1 mmol) of silver oxide was added and reaction was performed at room temperature for 4 hours while stirring the solution. At first, a black slurry was obtained, but as the complex was formed, the color faded gradually. Finally, a colorless, transparent solution was obtained. Methanol and unreacted materials were removed from the reaction solution to obtain 61.4 g of a colorless, transparent silver complex solution. Thermogravimetirc analysis (TGA) confirmed that the silver content was 15.1 wt %.

5.0 g of polyvinylbutyral (BS-18, Wacker), a binder, was dissolved in 55.0 g of the silver complex compound. Then, 40.0 g of silver flake (EA0295, Chemet) was added to obtain an ink composition having a viscosity of 1.12 Pa·s. The ink composition was coated on PET film and the resultant film was calcined at the temperature given in Table 1. Conductivity (planar resistance) and adhesivity of the film are given in Table 1.

Example 38

39.1 g (365.5 mmol) of ethylammonium ethylaminebicarbonate was dissolved in a mixture solution of 10.0 g of methanol and 10.0 g of methylcellosolve in a 250 mL Schlenk flask equipped with a stirrer. Then, 10.0 g (43.1 mmol) of silver oxide was added and reaction was performed at room temperature for 2 hours while stirring the solution. At first, a black slurry was obtained, but as the complex was formed, the color faded gradually. Finally, a colorless, transparent solution was obtained. Methanol and unreacted materials were removed from the reaction solution to obtain 55.1 g of a colorless, transparent silver complex solution. Thermogravimetirc analysis (TGA) confirmed that the silver content was 16.9 wt %.

5.0 g of polyvinylbutyral (BS-18, Wacker), a binder, was dissolved in 50.0 g of the silver complex compound. Then, 40.0 g of silver flake (EA0295, Chemet) was added. After 10 minutes of stirring, the solution was passed through a three-roll mill for 5 times to obtain an ink composition having a viscosity of 0.32 Pa·s. The ink composition was coated on PET film and the resultant film was calcined at the temperature given in Table 1. Conductivity (planar resistance) and adhesivity of the film are given in Table 1.

Example 39

50.0 g (258.0 mmol) of 2-methoxyethylammonium 2-methoxyethylcarbamate was dissolved in 80.0 of methanol in a 250 mL Schlenk flask equipped with a stirrer. Then, 20.0 g (86.2 mmol) of silver oxide was added and reaction was performed at room temperature for 2 hours while stirring the solution. At first, a black slurry was obtained, but as the complex was formed, the color faded gradually. Finally, a colorless, transparent solution was obtained. Methanol and unreacted materials were removed from the reaction solution to obtain 59.2 g of a yellow, transparent silver complex compound. Thermogravimetirc analysis (TGA) confirmed that the silver content was 31.4 wt %.

40.0 g of the silver complex compound and 40.0 g of silver flake (EA0295, Chemet) were added to a transparent solution in which 5.0 g of polyvinylbutyral (BS-18, Wacker), a binder, was dissolved in 10.0 g of methylcellosolve and 5.0 g of 2-ethylhexylamine. After 10 minutes of stirring, the solution was passed through a three-roll mill for 5 times to obtain an ink composition having a viscosity of 1.14 Pa·s. The ink composition was coated on PET film and the resultant film was calcined at the temperature given in Table 1. Conductivity (planar resistance) and adhesivity of the film are given in Table 1.

Example 40

57.8 g (240.8 mmol) of 3-methoxypropylammonium 3-methoxypropyl carbonate was dissolved in 80.0 of methanol in a 250 mL Schlenk flask equipped with a stirrer. Then, 20.0 g (86.2 mmol) of silver oxide was added and reaction was performed at room temperature for 2 hours while stirring the solution. At first, a black slurry was obtained, but as the complex was formed, the color faded gradually. Finally, a colorless, transparent solution was obtained. Methanol and unreacted materials were removed from the reaction solution to obtain 67.8 g of a yellow, transparent silver complex compound in liquid phase. Thermogravimetirc analysis (TGA) confirmed that the silver content was 27.4 wt %.

40.0 g of the silver complex compound and 40.0 g of silver flake (EA0295, Chemet) were added to a transparent solution in which 5.0 g of polyvinylbutyral (BS-18, Wacker), a binder, was dissolved in 10.0 g of methylcellosolve and 5.0 g of 2-ethylhexylamine. After 10 minutes of stirring, the solution was passed through a three-roll mill for 5 times to obtain an ink composition having a viscosity of 1.79 Pa·s. The ink composition was coated on PET film and the resultant film was calcined at the temperature given in Table 1 at the temperature given in Table 1. Conductivity (planar resistance) and adhesivity of the film are given in Table 1.

Example 41

65.6 g (258.0 mmol) of dimethoxyethylammonium dimethoxyethyl carbamate was dissolved in 80.0 of methanol in a 250 mL Schlenk flask equipped with a stirrer. Then, 20.0 g (86.2 mmol) of silver oxide was added and reaction was performed at room temperature for 2 hours while stirring the solution. At first, a black slurry was obtained, but as the complex was formed, the color faded gradually. Finally, a colorless, transparent solution was obtained. Methanol and unreacted materials were removed from the reaction solution to obtain 80.4 g of a yellow, transparent silver complex compound in liquid phase. Thermogravimetirc analysis (TGA) confirmed that the silver content was 23.1 wt %.

40.0 g of the silver complex compound and 40.0 g of silver flake (EA0295, Chemet) were added to a transparent solution in which 5.0 g of polyvinylbutyral (BS-18, Wacker), a binder, was dissolved in 10.0 g of butylcarbitol and 5.0 g of 2-ethylhexylamine After 10 minutes of stirring, the solution was passed through a three-roll mill for 5 times to obtain an ink composition having a viscosity of 3.02 Pa·s. The ink composition was coated on PET film and the resultant film was calcined at the temperature given in Table 1 at the temperature given in Table 1. Conductivity (planar resistance) and adhesivity of the film are given in Table 1.

Example 42

34.8 g (215.0 mmol) of isopropylammonium isopropylcarbamate was dissolved in 40.0 g of methanol and 40.0 g of methylcellosolve in a 250 mL Schlenk flask equipped with a stirrer. Then, 20.0 g (86.2 mmol) of silver oxide was added and reaction was performed at room temperature for 2 hours while stirring the solution. At first, a black slurry was obtained, but as the complex was formed, the color faded gradually. Finally, a colorless, transparent solution was obtained. Methanol and unreacted materials were removed from the reaction solution to obtain 92.0 g of a colorless, transparent silver complex solution. Thermogravimetirc analysis (TGA) confirmed that the silver content was 20.2 wt %.

5.0 g of polyvinylbutyral (BS-18, Wacker), a binder, was dissolved in 50.0 of the silver complex solution. Then, 2-ethylhexylamine and 40.0 g of silver flake (EA0295, Chemet) were added. After 10 minutes of stirring, the solution was passed through a three-roll mill for 5 times to obtain an ink composition having a viscosity of 0.89 Pa·s. The ink composition was coated on PET film and the resultant film was calcined at the temperature given in Table 1 at the temperature given in Table 1. Conductivity (planar resistance) and adhesivity of the film are given in Table 1.

Example 43

40.0 g of a silver complex solution prepared in the same manner as in Example 38 and 40.0 g of silver flake (EA0295, Chemet) were added to a solution in which 5.0 g of acryl (HPD62, Johnson Polymer), a binder, and 0.5 g of coco betaine, a surfactant, were dissolved in 14.5 g of water. After 10 minutes of stirring, the solution was passed through a three-roll mill for 5 times to obtain an ink composition having a viscosity of 0.18 Pa·s. The ink composition was coated on PET film and the resultant film was calcined at the temperature given in Table 1 at the temperature given in Table 1. Conductivity (planar resistance) and adhesivity of the film are given in Table 1.

Example 44

40.0 g of a silver complex solution prepared in the same manner as in Example 15, 41.2 g of silver flake (EA0295, Chemet) and 1.0 g of tetrabutoxytitanium, a metal precursor, were added to a transparent solution in which 5.0 g of polyvinylbutyral (BS-18, Wacker), a binder, was dissolved in 12.8 g of butylcarbitol. After 10 minutes of stirring, the solution was passed through a three-roll mill for 5 times to obtain an ink composition having a viscosity of 4.74 Pa·s. The ink composition was coated on PET film and the resultant film was calcined at the temperature given in Table 1 at the temperature given in Table 1. Conductivity (planar resistance) and adhesivity of the film are given in Table 1.

Example 45

40.0 g of a silver complex solution prepared in the same manner as in Example 15, 41.2 g of silver flake (EA0295, Chemet) and 1.0 g of bismuth acetate, a metal precursor, were added to a transparent solution in which 5.0 g of polyvinylbutyral (BS-18, Wacker), a binder, was dissolved in 12.8 g of butylcarbitol. After 10 minutes of stirring, the solution was passed through a three-roll mill for 5 times to obtain an ink composition having a viscosity of 2.26 Pa·s. The ink composition was coated on PET film and the resultant film was calcined at the temperature given in Table 1 at the temperature given in Table 1. Conductivity (planar resistance) and adhesivity of the film are given in Table 1.

Example 46

50.0 g of a silver complex solution prepared in the same manner as in Example 39, 30.0 of silver flake (EA0295, Chemet) and 1.0 g of vanadium oxide were added to 14.0 g of butylcarbitol in which 5.0 g of polyvinylbutyral (BS-18, Wacker), a binder, was dissolved. After 10 minutes of stirring, the solution was passed through a three-roll mill for 5 times to obtain an ink composition having a viscosity of 1.10 Pa·s. The ink composition was coated on PET film and the resultant film was calcined at the temperature given in Table 1 at the temperature given in Table 1. Conductivity (planar resistance) and adhesivity of the film are given in Table 1.

Example 47

20.0 g of a silver complex solution prepared in the same manner as in Example 15, 10.5 g of silver 2-ethylhexanoate used in Comparative Example 2 and 41.2 g of silver flake (EA0295, Chemet) were added to a transparent solution in which 5.0 g of polyvinylbutyral (BS-18, Wacker), a binder, was dissolved in 23.3 g of butylcarbitol. After 10 minutes of stirring, the solution was passed through a three-roll mill for 5 times to obtain an ink composition having a viscosity of 3.98 Pa·s. The ink composition was coated on PET film and the resultant film was calcined at the temperature given in Table 1 at the temperature given in Table 1. Conductivity (planar resistance) and adhesivity of the film are given in Table 1.

Example 48

60.0 g of a silver complex solution prepared in the same manner as in Example 15 and 31.5 g of silver 2-ethylhexanoate used in Comparative Example 2 were added to a mixture solution of 4.0 g of 2-ethylhexylamine and 4.5 g of butylcarbitol. After 10 minutes of stirring, an ink composition having a viscosity of 0.06 Pas·s was obtained. The ink composition was coated on PET film and the resultant film was calcined at the temperature given in Table 1 at the temperature given in Table 1. Conductivity (planar resistance) and adhesivity of the film are given in Table 1.

Example 49

70.0 g of silver flake (EA0295, Chemet) was added to 30.0 g of a silver complex compound in liquid phase prepared in the same manner as in Example 39. After 10 minutes of stirring, the solution was passed through a three-roll mill for 5 times to obtain an ink composition having a viscosity of 1.06 Pa·s. The ink composition screen-printed on PET film and heat treatment was performed at 100° C. for 5 minutes, and then, at 130° C. for 10 minutes. Conductivity (planar resistance) and adhesivity of the film are given in Table 1.

Example 50

84.9 g (0.5 mol) of silver nitrate was dissolved in 100 mL of an aqueous solution in a 500 mL flask equipped with a stirrer. Then, a solution in which 20.0 g of Solsperse28000 (Avecia) was dissolved in ethyl acetate was added as protective colloid. After 10 minutes of stirring, 149.8 g of dimethylethanolamine was added to the solution. After 5 hours of reaction while stirring, the colorless, transparent aqueous phase was separated from the dark brown organic phase. A dark brown silver colloid solution was obtained by extracting the organic phase.

Ethyl acetate was removed from this solution to obtain 32.5 g of brown silver nanoparticle having an average particle size of 10 nm. 30.0 g of the nanoparticle was redispersed in 20.0 g of ethyl acetate and 50.0 g of a silver complex compound prepared in the same manner as in Example 25 was added. After 10 minutes of stirring, an ink composition having a viscosity of 0.03 Pa·s was obtained. The ink composition was coated on polyimide film and the resultant uniform and precise film was calcined at the temperature given in Table 1. Conductivity (planar resistance) and adhesivity of the film are given in Table 1.

Example 51

32.5 g (107.5 mmol) of 2-ethylhexylammonium 2-ethylhexylcarbamate, a viscous liquid, was dissolved in 100 mL of methanol in a 250 mL Schlenk flask equipped with a stirrer. Then, 10.0 g (43.1 mmol) of silver oxide was added and reaction was performed at room temperature. As the reaction proceeded, the reaction mixture turned into a black slurry and finally into a colorless, transparent solution. The solvent was removed from the reaction solution in vacuum to obtain 42.0 g of a white silver complex compound. 5.3 g of 2-ethylhexylamine, a stabilizer, and 8.47 g of methanol, a solvent, were added to 20.0 g of the silver complex compound to obtain an ink composition having a viscosity of 5.7 cps. The ink composition was coated and the resultant uniform and precise film was calcined at the temperature given in Table 1. Conductivity (planar resistance) and adhesivity of the film are given in Table 1.

Example 52

8.2 g (86 mmol) of ammonium carbonate dissolved in 100 mL of methanol and 15.0 g (250 mmol) of isopropylamine were mixed in a 250 mL Schlenk flask equipped with a stirrer. Then, 10.0 g (43.1 mmol) of silver oxide was added and reaction was performed at room temperature. As the reaction proceeded, the reaction mixture turned into a black slurry and finally into a colorless, transparent solution. The solvent was removed from the reaction solution in vacuum to obtain 28.4 g of a white silver complex compound. 5.3 g of 2-ethylhexylamine, a stabilizer, and 8.47 g of methanol, a solvent, were added to 20.0 g of the silver complex compound to obtain an ink composition having a viscosity of 3.8 cps. The ink composition was coated and the resultant uniform and precise film was calcined at the temperature given in Table 1. Conductivity (planar resistance) and adhesivity of the film are given in Table 1.

Example 53

A transparent silver ink composition having a viscosity of 5.6 cps was prepared in the same manner as in Example 51 using 37.2 g of 2-ethylhexylammonium 2-ethylhexylcarbonate instead of 2-ethylhexylammonium 2-ethylhexylcarbamate. The ink composition was coated and the resultant uniform and precise film was calcined at the temperature given in Table 1. Conductivity (planar resistance) and adhesivity of the film are given in Table 1.

Example 54

A transparent silver ink composition having a viscosity of 5.3 cps was prepared in the same manner as in Example 51 using 48.6 g of 2-ethylhexylammonium 2-ethylhexylcarbonate instead of 2-ethylhexylammonium 2-ethylhexylcarbamate. The ink composition was coated and the resultant uniform and precise film was calcined at the temperature given in Table 1. Conductivity (planar resistance) and adhesivity of the film are given in Table 1.

Example 55

A transparent silver ink composition having a viscosity of 8.5 cps was prepared in the same manner as in Example 51 using 32.0 g of n-butylammonium n-butylcarbonate intead of 2-ethylhexylammonium 2-ethylhexylcarbamate and using 12.0 g of silver carbonate instead of silver oxide. The ink composition was coated and the resultant uniform and precise film was calcined at the temperature given in Table 1. Conductivity (planar resistance) and adhesivity of the film are given in Table 1.

Example 56

A transparent silver ink composition having a viscosity of 4.3 cps was prepared in the same manner as in Example 51 using 28.2 g of cyclohexylammonium cyclohexylcarbamate intead of 2-ethylhexylammonium 2-ethylhexylcarbamate. The ink composition was coated and the resultant uniform and precise film was calcined at the temperature given in Table 1. Conductivity (planar resistance) and adhesivity of the film are given in Table 1.

Example 57

A transparent silver ink composition having a viscosity of 5.3 cps was prepared in the same manner as in Example 51 using 31.2 g of benzylammonium benzylcarbamate intead of 2-ethylhexylammonium 2-ethylhexylcarbamate. The ink composition was coated and the resultant uniform and precise film was calcined at the temperature given in Table 1. Conductivity (planar resistance) and adhesivity of the film are given in Table 1.

Example 58

A transparent silver ink composition having a viscosity of 2.8 cps was prepared in the same manner as in Example 51 using 30.8 g of 2-methoxyethylammonium 2-methoxyethylbicarbonate intead of 2-ethylhexylammonium 2-ethylhexylcarbamate. The ink composition was coated and the resultant uniform and precise film was calcined at the temperature given in Table 1. Conductivity (planar resistance) and adhesivity of the film are given in Table 1.

Example 59

A transparent silver ink composition having a viscosity of 2.8 cps was prepared in the same manner as in Example 51 using 18.8 g of isopropylammonium isopropylbicarbonate and 25.0 g of octylammonium octylbicarbonate intead of 2-ethylhexylammonium 2-ethylhexylcarbamate. The ink composition was coated and the resultant uniform and precise film was calcined at the temperature given in Table 1. Conductivity (planar resistance) and adhesivity of the film are given in Table 1.

Example 60

A transparent silver ink composition having a viscosity of 22.6 cps was prepared in the same manner as in Example 51 using 19.7 g of 2-ethylhexylammonium 2-ethylhexylcarbamate and 12.7 g of 2-methoxyethylammonium 2-methoxyethylcarbamate intead of 2-ethylhexylammonium 2-ethylhexylcarbamate. The ink composition was coated and the resultant uniform and precise film was calcined at the temperature given in Table 1. Conductivity (planar resistance) and adhesivity of the film are given in Table 1.

Example 61

To 20.0 g of a silver complex compound prepared in the same manner as in Example 55 were added 1.2 g of ammonium carbonate, a stabilizer, 0.05 g of EFKA 3650 (EFKA) and 25.0 g of methoxypropyl acetate, a solvent, to prepare a transparent silver ink composition having a viscosity of 3.6 cps. The ink composition was coated and the resultant uniform and precise film was calcined at the temperature given in Table 1. Conductivity (planar resistance) and adhesivity of the film are given in Table 1.

Example 62

To 20.0 g of a silver complex compound prepared in the same manner as in Example 55 were added 1.2 g of 2,2-ethylenedioxybisethylam, a stabilizer, 0.05 g of EFKA 3650 (EFKA) and 25.0 g of methoxypropyl acetate, a solvent, to prepare a transparent silver ink composition having a viscosity of 3.2 cps. The ink composition was coated and the resultant uniform and precise film was calcined at the temperature given in Table 1. Conductivity (planar resistance) and adhesivity of the film are given in Table 1.

Example 63

To 12.0 of a silver complex compound prepared in the same manner as in Example 58 were added 0.2 g of tripropylamine, a stabilizer, 0.03 g of BYK 373 (BYK) and 20.0 g of 1-methoxypropanol, a solvent, to prepare a transparent silver ink composition having a viscosity of 3.3 cps. The ink composition was coated and the resultant uniform and precise film was calcined at the temperature given in Table 1. Conductivity (planar resistance) and adhesivity of the film are given in Table 1.

Example 64

To 12.0 of a silver complex compound prepared in the same manner as in Example 58 were added 0.2 g of diisopropylamine, a stabilizer, 0.03 g of BYK 373 (BYK) and 20.0 g of 1-methoxypropanol, a solvent, to prepare a transparent silver ink composition having a viscosity of 4.2 cps. The ink composition was coated and the resultant uniform and precise film was calcined at the temperature given in Table 1. Conductivity (planar resistance) and adhesivity of the film are given in Table 1.

Example 65

To 12.0 of a silver complex compound prepared in the same manner as in Example 53 were added 0.2 g of 3-methoxypropylamine, a stabilizer, 0.03 g of TEGO Wet 505 (Degussa) and 20.0 g of ethanol, a solvent, to prepare a transparent silver ink composition having a viscosity of 4.2 cps. The ink composition was coated and the resultant uniform and precise film was calcined at the temperature given in Table 1. Conductivity (planar resistance) and adhesivity of the film are given in Table 1.

Example 66

To 12.0 of a silver complex compound prepared in the same manner as in Example 53 were added 3.4 g of 2-ethylhexylamine, a stabilizer, 0.03 g of TEGO Wet 505 (Degussa) and 20.0 g of ethanol, a solvent, to prepare a transparent silver ink composition having a viscosity of 4.4 cps. The ink composition was coated and the resultant uniform and precise film was calcined at the temperature given in Table 1. Conductivity (planar resistance) and adhesivity of the film are given in Table 1.

Example 67

To 12.0 of a silver complex compound prepared in the same manner as in Example 53 were added 3.4 g of 2-ethylhexylamine, a stabilizer, 0.03 g of TEGO Wet 505 (Degussa) and 20.0 g of 1-propanol, a solvent, to prepare a transparent silver ink composition having a viscosity of 4.6 cps. The ink composition was coated and the resultant uniform and precise film was calcined at the temperature given in Table 1. Conductivity (planar resistance) and adhesivity of the film are given in Table 1.

Example 68

To 12.0 of a silver complex compound prepared in the same manner as in Example 53 were added 3.4 g of 2-ethylhexylamine, a stabilizer, 0.02 g of Rilanit HT-Extra (Cognis) and 12.7 g of methylcellosolve, a solvent, to prepare a transparent silver ink composition having a viscosity of 4.1 cps. The ink composition was coated and the resultant uniform and precise film was calcined at the temperature given in Table 1. Conductivity (planar resistance) and adhesivity of the film are given in Table 1.

Example 69

To 20.0 of a silver complex compound prepared in the same manner as in Example 53 were added 3.4 g of 2-ethylhexylamine, a stabilizer, 0.03 g of EFKA 3835 (EFKA) and 12.7 g of ethyl acetate, a solvent, to prepare a transparent silver ink composition having a viscosity of 6.5 cps. The ink composition was coated and the resultant uniform and precise film was calcined at the temperature given in Table 1. Conductivity (planar resistance) and adhesivity of the film are given in Table 1.

Example 70

To 20.0 of a silver complex compound prepared in the same manner as in Example 53 were added 3.4 g of 2-ethylhexylamine, a stabilizer, 0.05 g of EFKA 3777 (EFKA) and 12.7 g of toluene, a solvent, to prepare a transparent silver ink composition having a viscosity of 6.3 cps. The ink composition was coated and the resultant uniform and precise film was calcined at the temperature given in Table 1. Conductivity (planar resistance) and adhesivity of the film are given in Table 1.

Example 71

To 20.0 of a silver complex compound prepared in the same manner as in Example 53 were added 3.4 g of 2-ethylhexylamine, a stabilizer, 0.03 g of Glide 410 (Degussa) and 12.7 g of a 2:1 (weight ratio) mixture of 1-propanol and ethylcarbitol acetate, a solvent, to prepare a transparent silver ink composition having a viscosity of 6.2 cps. The ink composition was coated and the resultant uniform and precise film was calcined at the temperature given in Table 1. Conductivity (planar resistance) and adhesivity of the film are given in Table 1.

Example 72

To 20.0 of a silver complex compound prepared in the same manner as in Example 53 were added 3.4 g of 2-ethylhexylamine, a stabilizer, 0.03 g of DSX 1514 (Cognis) and 12.7 g of a 3:1:1 (weight ratio) mixture of N,N-dimethylformamide, N,N-dimethylsulfoxide and methanol, a solvent, to prepare a transparent silver ink composition having a viscosity of 7.8 cps. The ink composition was coated and the resultant uniform and precise film was calcined at the temperature given in Table 1. Conductivity (planar resistance) and adhesivity of the film are given in Table 1.

Example 73

To 20.0 of a silver complex compound prepared in the same manner as in Example 53 were added 3.4 g of 2-ethylhexylamine, a stabilizer, 0.1 g of EFKA 410 (EFKA) and 12.7 g of a 4:1 (weight ratio) mixture of 1-methyl-2-pyrrolidone and 2-butanol, a solvent, to prepare a transparent silver ink composition having a viscosity of 6.7 cps. The ink composition was coated and the resultant uniform and precise film was calcined at the temperature given in Table 1. Conductivity (planar resistance) and adhesivity of the film are given in Table 1.

Example 74

To 20.0 of a silver complex compound prepared in the same manner as in Example 53 were added 3.4 g of 2-ethylhexylamine, a stabilizer, 0.05 g of Surfynol 465 (Air Product) and 12.7 g of a 2:1:1 (weight ratio) mixture of water, polyethylene glycol (PEG) 200 and methanol, a solvent, to prepare a transparent silver ink composition having a viscosity of 8.9 cps. The ink composition was coated and the resultant uniform and precise film was calcined at the temperature given in Table 1. Conductivity (planar resistance) and adhesivity of the film are given in Table 1.

Example 75

26 g (0.20 mol) of 2-ethylhexylamine and 15 g (0.20 mol) of n-butylamine were dissolved in 10 g of methanol in a 250 mL Schlenk flask equipped with a stirrer. After stirring, 9.3 g (0.04 mol) of silver oxide was added and reaction was performed at room temperature while slowly bubbling carbon dioxide gas. As the reaction proceeded, the reaction mixture turned into a black slurry and finally into a colorless, transparent solution. The solvent was filtered with a 0.45-micron filter to obtain a clear, transparent silver complex compound in liquid phase. 3.5 g of 2-ethylhexylamine and 0.05 g of EFKA 3650 (EFKA) were added to 20.0 g of the silver complex compound to obtain a transparent silver ink composition having a viscosity of 15.4 cps. The ink composition was coated and the resultant uniform and precise film was calcined at the temperature given in Table 1. Conductivity (planar resistance) and adhesivity of the film are given in Table 1.

Example 76

26 g (0.20 mol) of 2-ethylhexylamine, 15 g (0.20 mol) of n-butylamine and 0.24 g of dodecylamine were added to a 250 mL pressurized container equipped with a stirrer. Then, 0.03 g of Rilanit HT-Extra (Cognis) and 10.0 g of methanol were added and the mixture solution was dissolved, by stirring. 9.3 g (0.04 mol) of silver oxide was added and reaction was performed while slowly injecting carbon dioxide gas to obtain a transparent silver ink composition having a viscosity of 135.0 cps. The ink composition was coated and the resultant uniform and precise film was calcined at the temperature given in Table 1. Conductivity (planar resistance) and adhesivity of the film are given in Table 1.

Example 77

A transparent silver ink composition having a viscosity of 2,300 cps was prepared by adding 4.8 g of ethylcellulose to 20.0 g of a silver complex compound prepared in the same manner as in Example 60. The ink composition was coated and the resultant uniform and precise film was calcined at the temperature given in Table 1. Conductivity (planar resistance) and adhesivity of the film are given in Table 1.

Example 78

A transparent silver ink composition having a viscosity of 19.2 cps was prepared by adding 2.0 g of 2-ethylhexylammonium 2-ethylhexylcarbamate to 20.0 g of a silver complex compound prepared in the same manner as in Example 60. The ink composition was coated and the resultant uniform and precise film was calcined at the temperature given in Table 1. Conductivity (planar resistance) and adhesivity of the film are given in Table 1.

Example 79

A transparent silver ink composition having a viscosity of 8,000 cps was prepared by adding 3.4 g of 2-ethylhexylamine, a stabilizer, 0.8 g of polyvinylbutyral (BL-18, Wacker) and 4.0 g of butylcellosolve to 20.0 g of a silver complex compound prepared in the same manner as in Example 60. The ink composition was coated and the resultant uniform and precise film was calcined at the temperature given in Table 1. Conductivity (planar resistance) and adhesivity of the film are given in Table 1.

Example 80

A transparent silver ink composition having a viscosity of 3.5 cps was prepared in the same manner as in Example 51 using 20.1 g of isopropylammonium isopropylcarbonate, instead of 2-ethylhexylammonium 2-ethylhexylcarbamate, 3.4 g of 2-ethylhexylamine, as stabilizer, and 12.7 g of water and 0.03 g of coco betaine, instead of methanol, as solvent. The ink composition was coated and the resultant uniform and precise film was calcined at the temperature given in Table 1. Conductivity (planar resistance) and adhesivity of the film are given in Table 1.

Example 81

20.1 g of isopropylammonium isopropylcarbonate and 13.0 g of water were added to a 250 mL Schlenk flask equipped with a stirrer. After stirring, 10.0 g (43.1 mmol) of silver oxide was added and reaction was performed at room temperature to prepare an aqueous solution of a silver complex compound. To 43.1 g of the silver complex compound in liquid phase were added 3.4 g of 2-ethylhexylamine, a stabilizer, and coco 0.03 g of betaine to obtain a transparent silver ink composition having a viscosity of 3.5 cps. The ink composition was coated and the resultant uniform and precise film was calcined at the temperature given in Table 1. Conductivity (planar resistance) and adhesivity of the film are given in Table 1.

Example 82

The transparent silver ink composition having a viscosity of 3.8 cps prepared in Example 52 was filled in a polyethylene container. Patterning was performed on PET film, imide film and glass plate using a flat printer equipped with a piezo type ink-jet printer head F083000 (Epson). The patterned sample was heat-treated at 80° C. for 5 minutes, and then at 130° C. for 10 minutes.

Example 83

Figure 7:
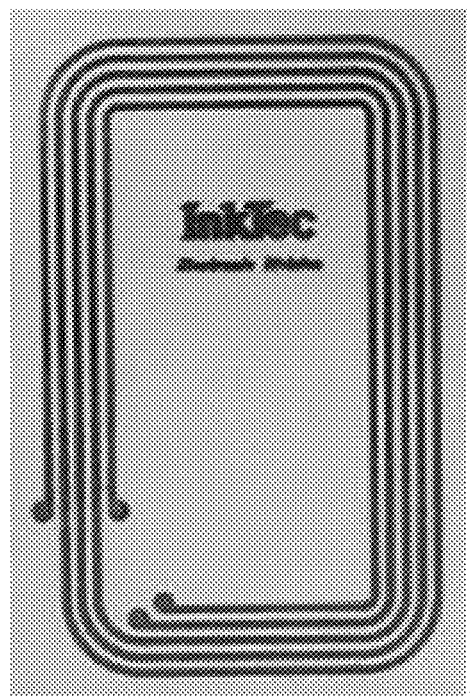
FIG. 7 is the pattern silk-screen printed on PET film using the ink composition of Example 83.

The transparent silver ink having a viscosity of 2,300 cps prepared in Example 76 was patterned on PET film using a silk-screen printer patterned to 320 meshes). The patterned sample was heat-treated at 100° C. for 3 minutes, and then at 130° C. for 10 minutes (see FIG. 7).

Example 84

Figure 8:
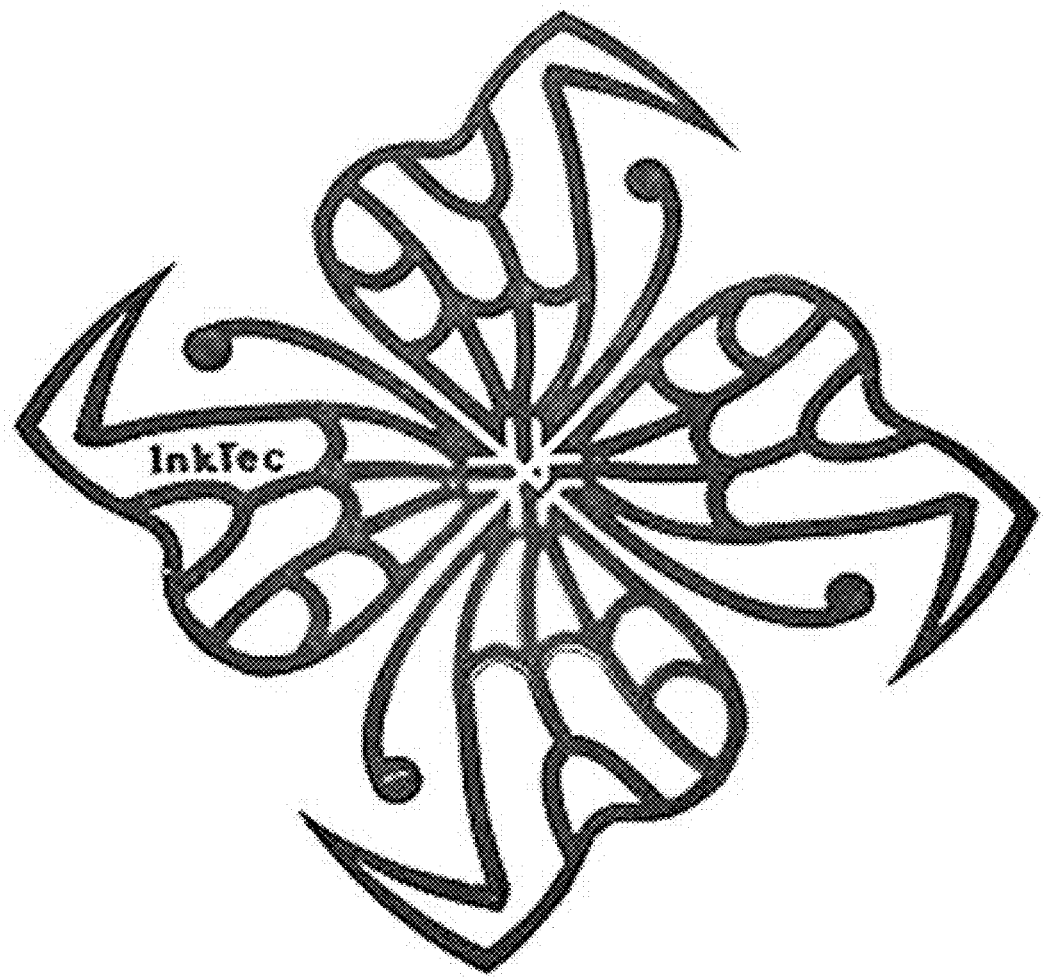
FIG. 8 is the pattern gravure printed using the ink composition of Example 84.

The transparent silver ink having a viscosity of 19.2 cps prepared in Example 77 was patterned on PET film pretreated with polyvinylbutyral resin using a graveur printer. The patterned sample was heat-treated at 80° C. for 2 minutes, at 100° C. for 3 minutes, and then at 130° C. for 10 minutes (see FIG. 8).

Example 85

Figure 9:
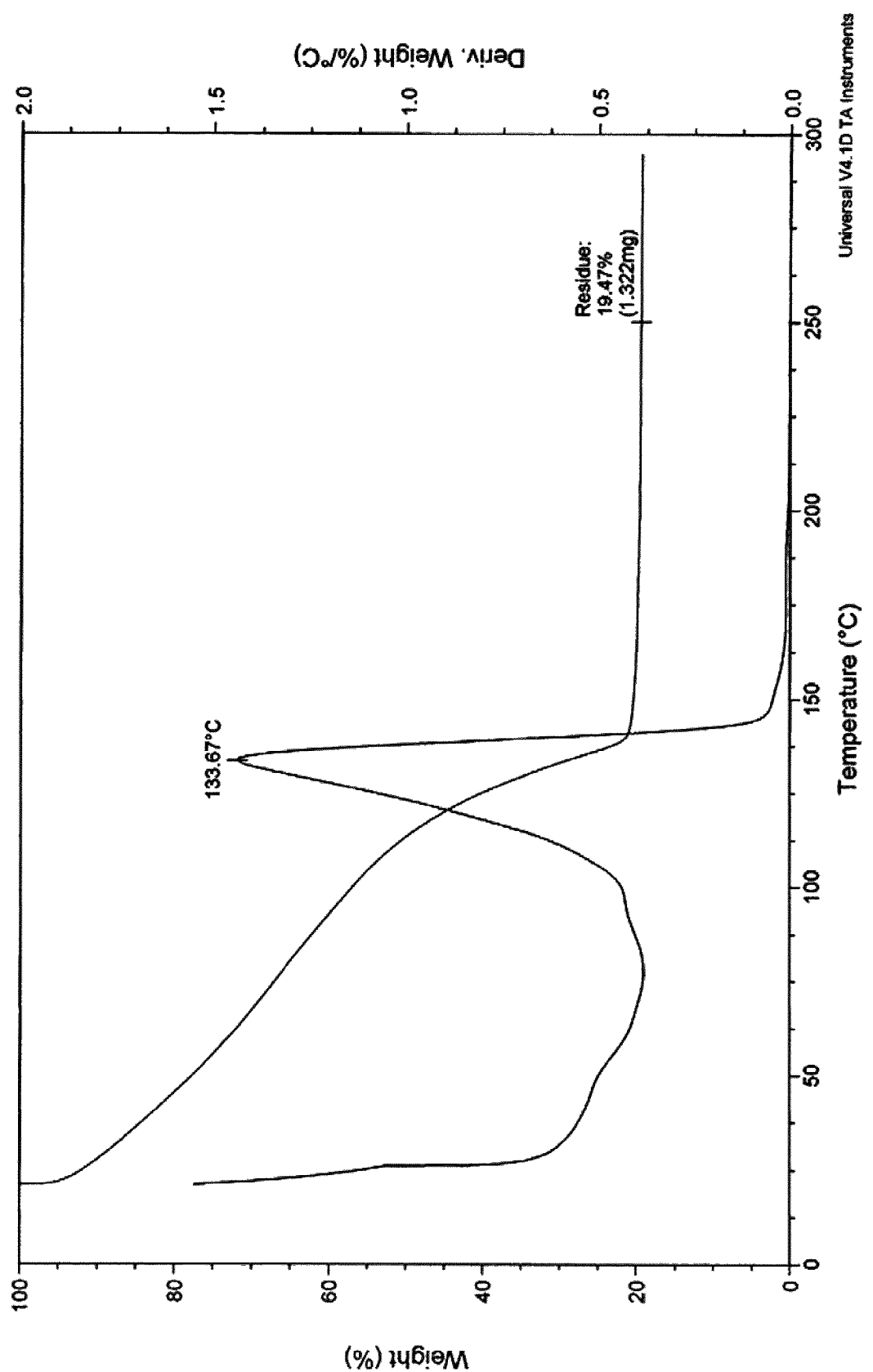
FIG. 9 is the TGA for the ink composition of Example 85.

90.22 g (556.16 mmol) of isopropylammonium isopropylcarbamate was dissolved in 400 mL of methanol in a 1,000 mL flask equipped with a stirrer. Then, 63.06 g (927.08 mmol) of a 50wt % hydrogen peroxide aqueous solution was slowly added to obtain a colorless, transparent solution. Reaction was performed at room temperature while slowly adding silver powder (SNGPSN-100-99, SOLNANOGY, average particle size=100 nm) until it was not dissolved any more. As the reaction proceeded, the reaction solution turned into a gray slurry and finally into a colorless transparent solution. The amount of consumed silver was 20.00 g (185.41 mmol). The reaction solution was filtered through a 0.45-micron membrane filter and the solvent was removed in vacuum to obtain 54.70 g of a white silver complex compound. Thermogravimetric analysis (TGA) confirmed that the silver content was 36.50 wt %. To 20.00 g of the silver complex compound were added 5.30 g of 2-ethylhexylamine, a stabilizer, and 12.49 g of methanol, a solvent, to obtain a o|transparent silver ink composition having a viscosity of 3.3 cps. Thermogravimetric analysis (TGA) confirmed that the ink composition had a silver content of 19.47 wt % (see FIG. 9). The ink composition was coated on PET film and the resultant uniform and precise film was calcined at the temperature given in Table 1. Conductivity (planar resistance) and adhesivity of the film are given in Table 1.

Example 86

40.00 g of the transparent silver ink composition prepared in Example 85 and 41.00 g of silver flake (EA0295, Chemet) were added to a transparent solution in which 5.00 g of polyvinylbutyral (BS-18, Wacker), a binder, was dissolved in 14.00 g of butylcarbitol. After 10 minutes of stirring, the solution was passed through a three-roll mill (Drais Mannheim) for 5 times to obtain a conductive ink composition having a silver content of 49.64 wt % and a viscosity of 2,500 cps. The ink composition was coated on PET film and the resultant uniform and precise film was calcined at the temperature given in Table 1. Conductivity (planar resistance) and adhesivity of the film are given in Table 1.

Example 87

40.00 g of the transparent silver ink composition prepared in Example 85 and 22.60 g of silver acetate were added to a mixture solution of 5.00 g of isopropylamine and 32.40 g of butylcarbitol. After a transparent silver ink composition having a viscosity 11.5 cps was obtained. The ink composition was coated on PET film and the resultant uniform and precise film was calcined at the temperature given in Table 1. Conductivity (planar resistance) and adhesivity of the film are given in Table 1.

Example 88

A colorless, transparent solution was obtained in the same manner as in Example 85 using 67.36 g (556.16 mmol) of isopropylammonium bicarbonate instead of isopropylammonium isopropylcarbamate. The amount of consumed silver was 12.80 g (118.66 mmol). The reaction solution was filtered through a 0.45-micron membrane filter and the solvent was removed in vacuum to obtain 33.62 g of a white silver complex compound. Thermogravimetric analysis (TGA) confirmed that the silver content was 37.50 wt %. To 20.00 g of the silver complex compound were added 5.30 g of 2-ethylhexylamine, a stabilizer, and 8.47 g of methanol, a solvent, to obtain a transparent silver ink composition having a viscosity of 3.5 cps. The ink composition was coated on PET film and the resultant uniform and precise film was calcined at the temperature given in Table 1. Conductivity (planar resistance) and adhesivity of the film are given in Table 1.

Example 89

A colorless, transparent solution was obtained in the same manner as in Example 85 using 50.12 g (278.08 mmol) of isopropylammonium isopropylcarbonate instead of isopropylammonium isopropylcarbamate and using the same amount of water instead of methanol. The amount of consumed silver was 3.60 g (33.37 mmol). The reaction solution was filtered through a 0.45-micron membrane filter and the solvent was removed in vacuum to obtain 11.31 g of a white silver complex compound. Thermogravimetric analysis (TGA) confirmed that the silver content was 31.50 wt %. To 10.00 g of the silver complex compound were added 2.65 g of 2-ethylhexylamine, a stabilizer, and 4.24 g of methanol, a solvent, to obtain a transparent silver ink composition having a viscosity of 3.6 cps. The ink composition was coated on PET film and the resultant uniform and precise film was calcined at the temperature given in Table 1. Conductivity (planar resistance) and adhesivity of the film are given in Table 1.

Example 90

A yellow, transparent solution was obtained in the same manner as in Example 85 using 108.20 g (556.16 mmol) of 2-methoxyethylammonium 2-methoxyethylcarbamate instead of isopropylammonium isopropylcarbamate. The amount of consumed silver was 11.20 g (103.83 mmol). The reaction solution was filtered through a 0.45-micron membrane filter and the solvent was removed in vacuum to obtain 35.40 g of a brown silver complex compound in liquid phase. Thermogravimetric analysis (TGA) confirmed that the silver content was 31.42 wt %. To 20.00 g of the silver complex compound were added 8.48 g of silver flake, 8.48 g of silver powder and a transparent solution in which 1.50 g of polyvinylbutyral, a binder, was dissolved in 11.54 g of butylcellosolve. After 10 minutes of stirring, the solution was passed through a three-roll mill (Drais Mannheim) for 5 times to obtain a conductive ink composition having a silver content of 46.49 wt % and a viscosity of 1,120 cps. The ink composition was coated on PET film and the resultant uniform and precise film was calcined at the temperature given in Table 1. Conductivity (planar resistance) and adhesivity of the film are given in Table 1.

Example 91

20.00 g of the silver complex compound prepared in Example 90, 16.96 g of silver flake, and 1.00 g of bismuth acetate, a metal precursor, were added to a transparent solution in which 1.50 g of polyvinylbutyral, a binder, was dissolved in 10.54 g of butylcellosolve. After 10 minutes of stirring, the solution was passed through a three-roll mill (Drais Mannheim) for 5 times to obtain conductive ink composition having a viscosity of 1,560 cps. The ink composition was coated on PET film and the resultant uniform and precise film was calcined at the temperature given in Table 1. Conductivity (planar resistance) and adhesivity of the film are given in Table 1.

Example 92

A colorless, transparent solution was obtained in the same manner as in Example 85 using 43.42 g (556.16 mmol) of ammonium carbamate instead of isopropylammonium isopropylcarbamate. The amount of consumed silver was 8.80 g (81.58 mmol). The reaction solution was filtered through a 0.45-micron membrane filter and the solvent was removed in vacuum to obtain 20.80 g of a white silver complex compound in liquid phase. Thermogravimetric analysis (TGA) confirmed that the silver content was 42.00 wt %. To 20.00 g of the silver complex compound were added 1.20 g of ammonium carbamate, stabilizer, 0.05 g of EFKA 3650 (EFKA) and 25.00 g of methoxypropyl acetate, a solvent, to obtain a transparent silver ink composition having a viscosity of 3.5 cps. The ink composition was coated on PET film and the resultant uniform and precise film was calcined at the temperature given in Table 1. Conductivity (planar resistance) and adhesivity of the film are given in Table 1.

Example 93

66.02 g (370.77 mmol) of a 2:1 (molar ratio) mixture of isopropylamine and boron acid was dissolved in 400 mL of methanol in a 1,000 mL flask equipped with a stirrer. 30.07 g (185.39 mmol) of isopropylammonium isopropylcarbamate was added and 63.06 g (927.08 mmol) of a 50 wt % hydrogen peroxide aqueous solution was slowly added to obtain a colorless, transparent solution. Subsequently, reaction was performed at room temperature while slowly adding metallic silver was until it was not dissolved any more. As the reaction proceeded, the reaction solution turned into a gray slurry and finally into a colorless transparent solution. The amount of consumed silver was 9.10 g (84.36 mmol). The reaction solution was filtered through a 0.45-micron membrane filter and the solvent was removed in vacuum to obtain 29.72 g of a white silver complex compound. Thermogravimetric analysis (TGA) confirmed that the silver content was 30.31 wt %. To 12.00 g of the silver complex compound were added 0.20 g of tripropylamine, a stabilizer, 0.03 g of BYK 373 (BYK) and 20.00 g of 1-methoxypropanol, a solvent, to obtain a transparent silver ink composition having a viscosity of 3.6 cps. The ink composition was coated on imide film and the resultant uniform and precise film was calcined at the temperature given in Table 1. Conductivity (planar resistance) and adhesivity of the film are given in Table 1.

Example 94

90.22 g (556.16 mmol) of isopropylammonium isopropylcarbamate was dissolved in 400 mL of methanol in a 1,000 mL flask equipped with a stirrer. The reaction mixture was cooled to −40° C. using a cooling bath and ozone gas was bubbled (6.21 g/hour) using an ozone generator (Ozone Generator-LAB2, Ozone Tech). Subsequently, reaction was performed at room temperature while slowly adding metallic silver was until it was not dissolved any more. As the reaction proceeded, the reaction solution turned into a gray slurry and finally into a colorless transparent solution. The amount of consumed silver was 5.20 g (48.21 mmol). The reaction solution was filtered through a 0.45-micron membrane filter and the solvent was removed in vacuum to obtain 14.68 g of a white silver complex compound. Thermogravimetric analysis (TGA) confirmed that the silver content was 35.00 wt %. To 10.00 g of the silver complex compound were added 2.65 g of 2-ethylhexylamine, a stabilizer, and 4.24 g of methanol, a solvent, to obtain a transparent silver ink composition having a viscosity of 3.7 cps. The ink composition was coated on PET film and the resultant uniform and precise film was calcined at the temperature given in Table 1. Conductivity (planar resistance) and adhesivity of the film are given in Table 1.

Example 95

90.22 g (556.16 mmol) of isopropylammonium isopropylcarbamate was dissolved in 400 mL of methanol in a 1,000 mL flask equipped with a stirrer. The reaction mixture was cooled to −40° C. using a cooling bath and ozone gas was bubbled (6.21 g/hour) using an ozone generator. Subsequently, reaction was performed while applying an alternating current (80 V, 60 Hz) to the solution using a silver foil as electrode until the silver electrode was not dissolved any more. As the reaction proceeded, the reaction solution turned into a gray solution and finally into a colorless transparent solution. The amount of consumed silver was 12.20 g (113.10 mmol). The reaction solution was filtered through a 0.45-micron membrane filter and the solvent was removed in vacuum to obtain 34.16 g of a white silver complex compound. Thermogravimetric analysis (TGA) confirmed that the silver content was 35.50 wt %. To 12.00 g of the silver complex compound were added 0.20 g of diisopropylamine, a stabilizer, 0.03 g of BYK 373 (BYK) and 20.00 g of 1-methoxypropanol, a solvent, to obtain a transparent silver ink composition having a viscosity of 3.8 cps. The ink composition was coated on PET film and the resultant uniform and precise film was calcined at the temperature given in Table 1. Conductivity (planar resistance) and adhesivity of the film are given in Table 1.

Example 96

90.22 g (556.16 mmol) of isopropylammonium isopropylcarbamate and 1.00 g of Surfyno1465 (Air Product) were dissolved in 400 mL of methanol in a 1,000 mL flask equipped with a stirrer. The reaction mixture was cooled to −40° C. using a cooling bath and ozone gas was bubbled. Subsequently, reaction was performed while applying an alternating current (80 V, 60 Hz) to the solution using a silver foil as electrode until the silver electrode was not dissolved any more. As the reaction proceeded, the reaction solution turned into a gray solution and finally into a colorless transparent solution. The amount of consumed silver was 9.40 g (87.14 mmol). The reaction solution was filtered through a 0.45-micron membrane filter and the solvent was removed in vacuum to obtain 27.73 g of a white silver complex compound. Thermogravimetric analysis (TGA) confirmed that the silver content was 33.80 wt %. To 12.00 g of the silver complex compound were added 0.20 g of 3-methoxypropylamine, a stabilizer, 0.03 g of TEGO Wet 505 (Degussa) and 20.00 g of ethanol, a solvent, to obtain a transparent silver ink composition having a viscosity of 3.3 cps. The ink composition was coated on PET film and the resultant uniform and precise film was calcined at the temperature given in Table 1. Conductivity (planar resistance) and adhesivity of the film are given in Table 1.

Example 97

Figure 10:
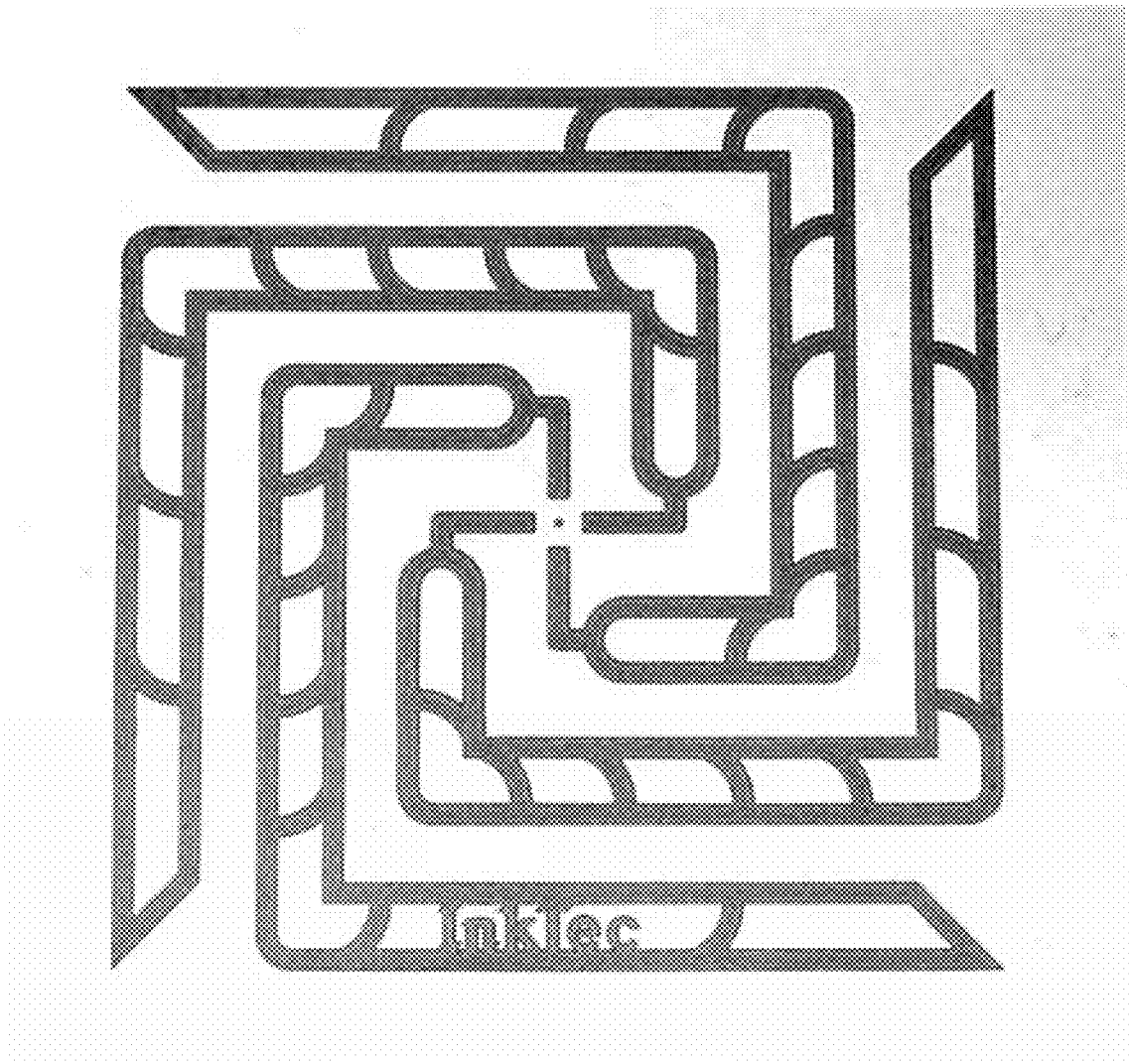
FIG. 10 is the pattern silk-screen printed on PET film using the ink composition of Example 97.

The conductive ink having a viscosity of 2,500 cps prepared in Example 86 was patterned on PET film using a silk-screen printer patterned to 320 meshes. The patterned sample was heat-treated at 100° C. for 3 minutes, and then at 130° C. for 10 minutes (see FIG. 10).

Comparative Example 1

50.2 g of silver flake (EA0295, Chemet) was added to a transparent solution in which 5.0 g of polyvinylbutyral (BS-18, Wacker), a binder, was dissolved in 44.8 g of butylcarbitol. After stirring for 10 minutes, the reaction solution was passed through a three-roll mill for 5 times to obtain an ink composition having a silver content of 50.2 wt % and a viscosity of 3.21 Pa·s. The ink composition was coated in the same manner as in Example 15 and the resultant film was calcined. Conductivity (planar resistance) and adhesivity of the film are given in Table 1. The conductivity and adhesivity were worse than Example 15 and cracks were observed.

Comparative Example 2

21.0 g of silver 2-ethylhexanoate and 41.2 g of silver flake (EA0295, Chemet) were added to a transparent solution in which 5.0 g of polyvinylbutyral (BS-18, Wacker), a binder, was dissolved in 32.8 g of butylcarbitol. After stirring for 10 minutes, the reaction solution was passed through a three-roll mill for 5 times to obtain an ink composition having a silver content of 50.2 wt % and a viscosity of 3.57 Pa·s. The ink composition was coated in the same manner as in Example 15 and the resultant film was calcined. Conductivity (planar resistance) and adhesivity of the film are given in Table 1. The conductivity and adhesivity were significantly worse than Example 15.

Comparative Example 3

A silver complex compound in liquid phase having a silver content of 22.0 wt % and a viscosity of 0.31 Pa·s prepared in the same manner as in Example 15 was coated in the same manner as in Example 15 and the resultant film was calcined. Conductivity (planar resistance) and adhesivity of the film are given in Table 1. The film was thin and conductivity was worse than Example 15. Uniformity of the film was also poor.

Comparative Example 4

To 20.0 g of the silver complex compound prepared in Example 51 was added 13.8 g of methanol, a solvent, without using 2-ethylhexylamine, a stabilizer, to obtain a transparent silver ink composition having a viscosity of 5.5 cps. The ink composition was coated in the same manner as in Example 51 and the resultant film was calcined. Conductivity (planar resistance) and adhesivity of the film are given in Table 1. The conductivity and adhesivity were worse than Example 51 and cracks were observed.

Comparative Example 5

A transparent silver ink composition having a viscosity of 5.6 cps was prepared by using 5.0 g of silver hexanoate and adding 5.3 g of 2-ethylhexylamine, a stabilizer, and 5.54 g of methanol, a solvent. The ink composition was coated in the same manner as in Example 51 and the resultant film was calcined. Conductivity (planar resistance) and adhesivity of the film are given in Table 1. The conductivity and adhesivity were significantly worse than Example 51.

TABLE 1

Physical properties of films prepared in Examples and Comparative Examples

| | Calcination temperature (° C.) | Conductivity (Ω/□) | Adhesivity |
|---|---|---|---|
| Example 1 | 150 | 0.472 | ○ |
| Example 2 | 150 | 0.089 | ○ |
| Example 3 | 150 | 0.210 | ○ |
| Example 4 | 180 | 0.924 | Δ |
| Example 5 | 200 | 0.528 | ○ |
| Example 6 | 150 | 0.162 | ○ |
| Example 7 | 180 | 0.956 | ○ |
| Example 8 | 180 | 0.742 | ○ |
| Example 9 | 200 | 0.174 | ○ |
| Example 10 | 200 | 0.152 | ○ |
| Example 11 | 200 | 0.193 | ○ |
| Example 12 | 180 | 1.831 | ○ |
| Example 13 | 150 | 0.470 | ○ |
| Example 14 | 150 | 0.098 | ○ |
| Example 15 | 130 | 0.115 | ○ |
| Example 16 | 130 | 0.477 | ○ |
| Example 17 | 130 | 0.320 | ○ |
| Example 18 | 130 | 0.779 | ○ |
| Example 19 | 130 | 0.954 | ○ |
| Example 20 | 130 | 0.789 | ○ |
| Example 21 | 130 | 0.368 | ○ |
| Example 22 | 130 | 0.377 | ○ |
| Example 23 | 130 | 0.340 | ○ |
| Example 24 | 130 | 0.865 | Δ |
| Example 25 | 130 | 0.405 | ○ |
| Example 26 | 130 | 0.724 | Δ |
| Example 27 | 130 | 0.534 | ○ |
| Example 28 | 250 | 0.120 | ○ |
| Example 29 | 250 | 0.456 | ○ |
| Example 30 | 250 | 0.389 | ○ |
| Example 31 | 130 | 0.128 | ○ |
| Example 32 | 130 | 0.456 | ○ |
| Example 33 | 130 | 0.132 | ○ |
| Example 34 | 130 | 0.497 | ○ |
| Example 35 | 130 | 0.048 | ○ |
| Example 36 | 130 | 0.024 | ○ |
| Example 37 | 130 | 0.241 | ○ |
| Example 38 | 100 | 0.133 | Δ |
| Example 39 | 130 | 0.537 | ○ |
| Example 40 | 130 | 0.134 | ○ |
| Example 41 | 150 | 0.346 | ○ |
| Example 42 | 130 | 0.351 | ○ |
| Example 43 | 130 | 0.545 | Δ |
| Example 44 | 130 | 0.349 | ○ |
| Example 45 | 130 | 0.641 | ○ |
| Example 46 | 130 | 0.389 | ○ |
| Example 47 | 130 | 0.237 | ○ |
| Example 48 | 130 | 0.596 | ○ |
| Example 49 | 130 | 0.014 | ○ |
| Example 50 | 200 | 0.458 | ○ |
| Example 51 | 130 | 0.22 | ○ |
| Example 52 | 130 | 0.30 | ○ |
| Example 53 | 130 | 0.25 | ○ |
| Example 54 | 130 | 0.25 | ○ |
| Example 55 | 130 | 0.48 | Δ |
| Example 56 | 120 | 0.58 | Δ |
| Example 57 | 130 | 0.44 | Δ |
| Example 58 | 130 | 0.38 | ○ |
| Example 59 | 250 | 0.37 | ○ |
| Example 60 | 130 | 0.29 | ○ |

TABLE 1-continued

Physical properties of films prepared in Examples and Comparative Examples

| | Calcination temperature (° C.) | Conductivity (Ω/□) | Adhesivity |
|---|---|---|---|
| Example 61 | 250 | 0.50 | ○ |
| Example 62 | 250 | 0.56 | ○ |
| Example 63 | 100 | 0.25 | Δ |
| Example 64 | 100 | 0.28 | Δ |
| Example 65 | 120 | 0.41 | Δ |
| Example 66 | 130 | 0.38 | Δ |
| Example 67 | 130 | 0.35 | ○ |
| Example 68 | 130 | 0.45 | ○ |
| Example 69 | 130 | 0.35 | Δ |
| Example 70 | 250 | 0.51 | Δ |
| Example 71 | 130 | 0.55 | ○ |
| Example 72 | 130 | 0.58 | Δ |
| Example 73 | 250 | 0.90 | ○ |
| Example 74 | 130 | 1.00 | Δ |
| Example 75 | 130 | 0.24 | Δ |
| Example 76 | 130 | 0.39 | ○ |
| Example 77 | 130 | 0.51 | ○ |
| Example 78 | 130 | 0.32 | ○ |
| Example 79 | 130 | 0.42 | ○ |
| Example 80 | 130 | 0.65 | Δ |
| Example 81 | 130 | 0.61 | Δ |
| Example 82 | 130 | 0.38 | ○ |
| Example 83 | 250 | 0.32 | ○ |
| Example 84 | 130 | 0.58 | ○ |
| Example 85 | 130 | 0.25 | ○ |
| Example 86 | 130 | 0.11 | ○ |
| Example 87 | 130 | 0.35 | ○ |
| Example 88 | 130 | 0.28 | ○ |
| Example 89 | 150 | 0.71 | Δ |
| Example 90 | 150 | 0.23 | ○ |
| Example 91 | 130 | 0.64 | ○ |
| Example 92 | 130 | 0.45 | ○ |
| Example 93 | 200 | 0.53 | ○ |
| Example 94 | 130 | 0.28 | ○ |
| Example 95 | 130 | 0.33 | ○ |
| Example 96 | 100 | 0.31 | ○ |
| Example 97 | 130 | 0.12 | ○ |
| Comparative Example 1 | 130 | 1.106 | Δ |
| Comparative Example 2 | 130 | 3.425 | X |
| Comparative Example 3 | 130 | 0.455 | Δ |
| Comparative Example 4 | 130 | 0.35 | Δ |
| Comparative Example 5 | 130 | 5000 | X |

(1) Adhesvity test: Evaluated by attaching and detaching Scotch tape (3M) on the printed surface of film.
○: Film surface was not peeled.
Δ: Part of film surface was peeled.
X: Most of film surface was peeled.
(2) Conductivity test: Planar resistance was measured for a 1 cm × 1 cm square sample using CMT-SR1000N (AIT).

INDUSTRIAL APPLICABILITY

The present invention relates to a variety of conductive ink compositions comprising a metal complex compound having a special structure and an additive and a method for preparing the same. The ink composition of the present invention has superior stability and solubility, enables easy film formation and is calcined readily even at low temperature of 200° C. or below for formation of film or pattern with good conductivity. It can be coated on or directly printed on a variety of substrates, including metal, glass, silicon wafer, ceramic, plastic film like polyester or polyimide, rubber sheet, fiber, wood, paper, etc.

The composition of the present invention enables uniform film formation and offers a film with superior conductivity and adhesivity. In addition, the film has a superior quality, with no crack.

The ink composition of the present invention can be used widely for EMI shielding materials, conductive adhesives, low-resistance metal wirings, PCBs, FPCs, antennas for RFID tags, solar cells, secondary cells or fuel cells and electrodes or wiring materials for PDPs, TFT-LCDs, OLEDs, flexible displays, OTFTs, etc.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of this invention as set forth in the appended claims.

The invention claimed is:

1. A method for preparing a metal-containing film comprising the steps of:
coating a conductive ink composition comprising a metal complex compound obtained by reacting at least one metal or metal compound represented by the formula 1 below with at least one ammonium carbamate- or ammonium carbonate-based compound represented by the formula 2, 3 or 4 below and an additive:

"M" is a metal or metal alloy, n is an integer from 1 to 10 and X is nonexistent or at least one substituent selected from the group consisting of hydrogen, ammonium, oxygen, sulfur, halogen, cyano, cyanate, carbonate, nitrate, nitrite, sulfate, phosphate, thiocyanate, chlorate, perchlorate, tetrafluoroborate, acetylacetonate, mercapto, amide, alkoxide, carboxylate and derivatives thereof; and

where each of R1, R2, R3, R4, R5 and R6 is independently selected from hydrogen; substituted or unsubstituted $C_1$-$C_{30}$ aliphatic alkyl, cycloaliphatic alkyl, aryl or aralkyl; polymer compound; heterocyclic compound; and derivatives thereof, wherein R1 and R2 or R4 and R5 may be connected with each other to form an alkylene ring with or without a heteroatom, wherein in Formula (2), at least one of R1-R5 is not hydrogen; in Formula (3), at least one of R1-R6 is not hydrogen; and in Formula (4), at least one of R1-R3 is not hydrogen; and
treating the same by oxidation, reduction, heat treatment, IR treatment, UV treatment, electron beam treatment or laser treatment.

2. The method for preparing a metal-containing film as set forth in claim 1, wherein the film is formed by coating on a substrate.

3. The method for preparing a metal-containing film as set forth in claim 2, wherein the substrate is at least one selected from the group consisting of metal, glass, silicon wafer, ceramic, polyester, polyimide, rubber sheet, fiber, wood and paper.

4. The method for preparing a metal-containing film as set forth in claim 2, wherein the substrate is pre-treated before use.

5. The method for preparing a metal-containing film as set forth in claim 4, wherein the pre-treatment is performed by at least one method selected from the group consisting of plasma treatment, ion beam treatment, corona treatment, oxidation or reduction, heating, etching, UV treatment and primer treatment.

6. The method for preparing a metal-containing film as set forth in claim 1, wherein the heat treatment is performed in air, nitrogen, argon, carbon monoxide, hydrogen or a mixture gas thereof.

7. The method for preparing a metal-containing film as set forth in claim 1, wherein the heat treatment is performed in the temperature range from 80 to 300° C.

8. The method for preparing a metal-containing film as set forth in claim 1, wherein the heat treatment is performed at 80-150° C. for 1-30 minutes, and then at 150-300° C. for 1-30 minutes.

9. The method for preparing a metal-containing film as set forth in claim 1, wherein the coating is performed by spin coating, roll coating, spray coating, dip coating, flow coating or doctor blade coating.

10. The method for preparing a metal-containing film as set forth in claim 1, wherein the coating is performed by dispensing, ink-jet printing, offset printing, screen printing, pad printing, gravure printing, flexography, stencil printing, imprinting, xerography or lithography.

11. The method for preparing a metal-containing film as set forth in claim 1, wherein the coating is performed by dissolving the conductive ink composition in at least one solvent selected from the group consisting of water, alcohol, glycol, acetate, ether, ketone, aliphatic hydrocarbon, aromatic hydrocarbon and halogenated hydrocarbon.

12. The method for preparing a metal-containing film as set forth in claim 11, wherein the solvent is at least one selected from the group consisting of water, methanol, ethanol, isopropanol, 1-methoxypropanol, butanol, ethylhexyl alcohol, terpineol, ethylene glycol, glycerine, ethyl acetate, butyl acetate, methoxypropyl acetate, carbitol acetate, ethylcarbitol acetate, methylcellosolve, butylcellosolve, diethyl ether, tetrahydrofuran, dioxane, methyl ethyl ketone, acetone, dimethylformamide, 1-methyl-2-pyrrolidone, hexane, heptane, dodecane, paraffin oil, mineral spirit, benzene, toluene, xylene, chloroform, methylene chloride, carbon tetrachloride, acetonitrile and dimethylsulfoxide.

\* \* \* \* \*